US005501752A

United States Patent [19]

Owens et al.

[11] Patent Number: 5,501,752

[45] Date of Patent: Mar. 26, 1996

[54] WOODEN I-BEAM ASSEMBLY MACHINE AND CONTROL SYSTEM THEREFOR

[75] Inventors: William M. Owens, Tacoma; Victor Croston, Gig Harbor, both of Wash.

[73] Assignee: Globe Machine Manufacturing Company, Tacoma, Wash.

[21] Appl. No.: 147,526

[22] Filed: Nov. 5, 1993

[51] Int. Cl.$^6$ .................................................... B32B 31/00

[52] U.S. Cl. ........................... 156/64; 156/363; 156/364; 156/556; 156/560; 156/566

[58] Field of Search ............................ 156/64, 362, 363, 156/364, 556, 560, 566

[56] References Cited

U.S. PATENT DOCUMENTS

| | | | |
|---|---|---|---|
| 1,150,302 | 8/1915 | Perkins et al. | 198/463.4 |
| 1,631,150 | 6/1927 | Owen | 198/481.1 |
| 2,941,655 | 6/1960 | Wells | 198/408 |
| 3,039,588 | 6/1962 | Harnack | 198/463.4 |
| 3,092,513 | 6/1963 | Browning | 118/212 |
| 3,194,380 | 7/1965 | Watson | 156/499 |
| 3,209,890 | 10/1965 | Miles | 198/463.4 |
| 3,367,478 | 2/1968 | Brookhyser | 156/364 X |
| 3,490,188 | 1/1970 | Troutner | 52/644 |
| 3,494,455 | 2/1970 | Sarring | 198/408 |
| 3,616,091 | 10/1971 | Troutner | 156/560 |
| 3,894,908 | 7/1975 | Troutner et al. | 156/258 |
| 3,917,503 | 11/1975 | Tamura et al. | 156/499 |
| 4,074,498 | 2/1978 | Keller et al. | 52/690 |
| 4,123,315 | 10/1978 | Keller et al. | 156/559 |
| 4,191,000 | 3/1980 | Henderson | 52/729 |
| 4,195,462 | 4/1980 | Keller et al. | 52/690 |
| 4,243,465 | 1/1981 | Gozzi | 156/363 X |
| 4,249,355 | 2/1981 | Anderson et al. | 52/593 |
| 4,336,678 | 6/1982 | Peters | 52/729 |
| 4,356,045 | 10/1982 | Elford et al. | 156/64 |
| 4,413,459 | 11/1983 | Lambuth | 52/729 |
| 4,456,497 | 6/1984 | Eberle | 156/257 |
| 4,458,465 | 7/1984 | Coe | 156/729 |
| 4,519,492 | 5/1985 | Focke | 198/408 |
| 4,601,384 | 7/1986 | Van Doren | 198/481.1 |
| 4,665,306 | 5/1987 | Roland et al. | 425/174.4 |
| 4,797,169 | 1/1989 | Aizawa et al. | 156/363 X |
| 4,846,923 | 7/1989 | Lines | 156/566 |
| 4,869,360 | 9/1989 | Brown et al. | 198/463.4 |
| 4,945,976 | 8/1990 | Ritola | 198/463.4 |
| 5,080,339 | 1/1992 | Hirahara | 270/21.1 |

*Primary Examiner*—David A. Simmons
*Assistant Examiner*—Paul M. Rivard
*Attorney, Agent, or Firm*—Lowe, Price, LeBlanc & Becker

[57] ABSTRACT

A production line for manufacturing wooden I-beams wherein a pair of grooved flanges are conveyed along opposite left and right sides of a train of web members and converged so that the web longitudinal edges are inserted into the flange grooves is disclosed. The flanges are moved along left and right hand chutes of the assembly machine with plural vertical flange drive rolls engaging the wider flange faces for improved traction. These flange drive rolls and the chutes are mounted to the machine base with a lateral adjustment mechanism permitting center justified adjusting movement relative to the machine center line. The lateral adjustment mechanism utilizes a series of lead screws each formed with left and right handed threaded portions engageable with a threaded nut attached to each chute. A pair of web bottom rails are vertically adjustable in elevation with plural vertical column screws connected between the machine base and the support rails. Each of the infeed and outfeed flange drive rolls, and the web drive rolls, are all operated with hydraulic motors which are interconnected through microprocessor control so as to be monitored and adjusted during a production run to achieve substantially constant output speeds with predictable and repeatable drive roll speeds and pinching forces.

31 Claims, 25 Drawing Sheets

WOODEN I-BEAM ASSEMBLY MACHINE AND CONTROL SYSTEM THEREFOR

TECHNICAL FIELD

The present invention relates generally to improved apparatus and methods of making a wooden I-beam from a pair of wood flanges and web members interconnecting the flanges and, more particularly, to control systems allowing for operator control over the various flange and web drive systems.

BACKGROUND ART

Fabricated wooden I-beams each comprising a pair of wooden flanges and web members having longitudinal edges received in grooves of the flanges are becoming increasingly popular due to the rising costs of sawn lumber and the scarcity of good quality wood capable of producing beams of large size. The fabricated wooden I-beams require less wood and also reduces the costs of transportation due to their lower weight. Wooden I-beams of this type have been disclosed extensively in the prior art with exemplary patents being U.S. Pat. Nos. 3,490,188, 4,074,498, 4,191,000, 4,195,462, 4,249,355, 4,336,678, 4,356,045, 4,413,459, 4,456,497 and 4,458,465.

Prior known procedures for forming fabricated wooden I-beams by gluing the members together have generally entailed the use of various conveyor and drive assemblies in which a series of webs are driven along a web conveyor line in either spaced or end-to-end abutting relationship, with a pair of grooved flanges driven along opposite sides of the web conveyor. The flanges are driven with their grooves facing the webs and are gradually converged toward the conveyed webs so that the longitudinal web edges, usually pre-glued, enter the grooves to form an interconnecting glued joint therebetween.

In most prior art arrangements of which we are aware, the flange drive roll assemblies engage the narrow faces of the flanges which result in poor surface contact and inadequate or inefficient control over traction forces.

Another problem with prior art systems of which we are aware is that the flanges are typically conveyed through the machine in which flange bottom support is provided with horizontal rolls. At higher speeds of operation, these rolls tend to create undesirable vibration which causes the flanges to bounce. This may result in mis-alignment with the plane along which the webs are conveyed.

In most prior art assembly lines of which we are aware, one of the machine sides is fixed while the other machine side is laterally movable to provide for lateral adjustment for different web widths. This type of system necessitates the use of web drive systems which are formed with universal spline joints and therefore necessitate the need for sliding spline drives. This unnecessarily increases the cost and sophistication of the machine.

Another significant problem associated with prior art assembly lines of which we are aware is that the various web and flange drive systems are extensively manually adjusted prior to any particular production run and there exists no control system associated with the machine to allow for repeatability in performance. Therefore, there exists difficulty in the ability to replicate and control the manufacturing process.

It is accordingly one object of the present invention to control the forces against the webs and against the flanges with the web and flange drives to obtain uniform, repeatable and adequate force applications.

Another object is to control the process to ensure that the outfeed is running at a substantially constant velocity while regulating the forces and the speed at which the webs and flanges are driven and compressed together.

Another object is to control the web and flange infeed and outfeed drives with hydraulically operated motor drives that have closed loop servo controls utilizing encoders to sense velocity and hydraulic pressure transducers to sense torque loading.

Still a further object is to utilize simple and easy to operate adjustment mechanisms to accommodate webs of different width and thickness and different flange sizes.

Still a further object is to improve traction forces driving the flanges through the system and to provide for the smooth flow of flanges with minimum bounce and vibration.

DISCLOSURE OF THE INVENTION

A production line assembly machine for manufacturing a wooden I-beam from a pair of elongated wooden flange members and planar wooden web members, in accordance with the present invention, comprises a pair of flange chutes mounted to a machine base for conveying an opposing pair of flanges along left and right hand sides of the machine, respectively. A flange infeed drive assembly drives the flanges along the flange chutes. A web conveyor area is disposed between the flange chutes for conveying the web members between the left and right flange pairs. A web drive system drives the webs in end- to-end relationship between the flange chutes. The flange chutes converge towards the machine center line axis to enable the web edges to be respectively inserted into the flange grooves in joined relationship to form the beam. A flange outfeed drive assembly then engages the flanges of the joined beam to convey the same towards the discharged end of the machine.

In accordance with the invention, a lateral adjustment mechanism is connected between the flange chutes and the machine base for simultaneously moving the chutes in either inward or outward center justified relation to the machine center line axis to thereby vary the spacing between the flanges relative to the center line and allow for use of webs of different width. The feature of center line justified lateral adjustment eliminates the need for complex web drives formed with universal splined driving axes and also results in a mechanism which is easy to adjust. Preferably, closed loop feedback control of this horizontal positioning control would be provided to assure machine set-up was accurate and maintained.

In the preferred embodiment, the lateral adjustment mechanism includes a plurality of laterally extending lead screw assemblies mounted to the machine base at longitudinally spaced intervals. Each lead screw assembly preferably includes a lead screw having an unthreaded central portion and opposite end portions which are left and right handed threaded portions, respectively. Bearing members are attached to the machine base for rotatably supporting the unthreaded central portion. A pair of lateral movement transmitting mechanisms are provided, each including at least one slide block and nut arrangement both connected with a respective one flange chute and in respective sliding engagement with the central portion and an associated one of the threaded portions. Rotation of the lead screw causes the chutes to jointly move laterally inward or outward through the action of the left and right handed screw portions.

The lateral adjustment mechanism preferably also includes a drive system having a motor and connecting drive shafts for synchronously rotating each of the lead screws.

Each flange chutes preferably has a bottom formed with a generally flat surface extending the length of the machine to support the flanges in smooth sliding engagement. This eliminates the need for supporting bottom rolls that could create undesirable vibration and bounce at higher operating speeds.

The flange infeed drive assembly preferably includes a plurality of drive rolls respectively having vertical rotational axes and located adjacent each chute to engage the wide faces of the flanges. Plural idler rolls are respectively associated with each drive roll and are positioned on opposite sides of the associated chute to contact the opposite wide face of the flange being conveyed along the chute. By contacting the wider faces of the flanges, greater traction forces are generated to ensure positive and firm control over the flanges during conveyance.

Each idler roll preferably has an axis of rotation which is canted toward the chute by a predetermined angle from the vertical. In the preferred embodiment, this predetermined angle is approximately one-half to one degree and eliminates the need for plural overboard hold-down rolls in each chute.

The infeed flange drive rolls are preferably swingably mounted to associated chutes on a swing arm pivotally connected to the chute. A cylinder extending between the chute and the drive roll is used to move the drive roll between a flange engaging position and a disengaging position. This cylinder also controls pinching forces.

The web conveyor area includes a pair of web bottom support rails located between the chutes. In accordance with another feature of this invention, plural vertical column screws are used to connect the rails to the machine base. Rotation of the column screws results in vertical height adjusting movement of the rails relative to, and inbetween, the chutes.

A plurality of nut portions extend between the rails. The column screws are respectively threadedly received in the nut portions. A first upper bearing mounted between the rails is used to rotatably connect the upper portion of the screw to the machine base. A second lower bearing rotatably connects the lower portion of the screw to the base. This arrangement allows for fine and synchronous control over the rail vertical height adjustment process while enabling lateral forces generated during the assembly process to be transmitted to the machine base from the web train through the column screws.

Optionally, a single motor is interconnected to each column screw through plural drive shafts so as to provide for synchronous screw rotation. Preferably, closed loop feedback control of this vertical positioning control would be provided to assure machine set-up was accurate and maintained.

In accordance with another preferred feature of the this invention, the infeed flange drive rolls, the web drive rolls (top and bottom) and the flange outfeed drive rolls are all provided with a dedicated hydraulic motor. These drive motors are connected in predetermined hydraulic circuits which are operated through microprocessor control to control the speed and forces exerted by the different drive rolls against the flanges and the webs to ensure a substantially constant product speed through the machine. Preferably, closed loop feedback control of all web and flange drives would be used to coordinate the relationship between infeed flange drives, web feed drives, and the outfeed drives. Feedback of drive positions and drive forces control the point of closure of the web and web-to-flange joints and the compression forces applied to these joints.

The control means is further operable to adjust the left and right outfeed drive rolls based upon means for sensing an identifier (e.g., a notch) in each flange to ensure matched left and right outfeed drive speeds, to eliminate creep of either the left or right hand flange.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1:
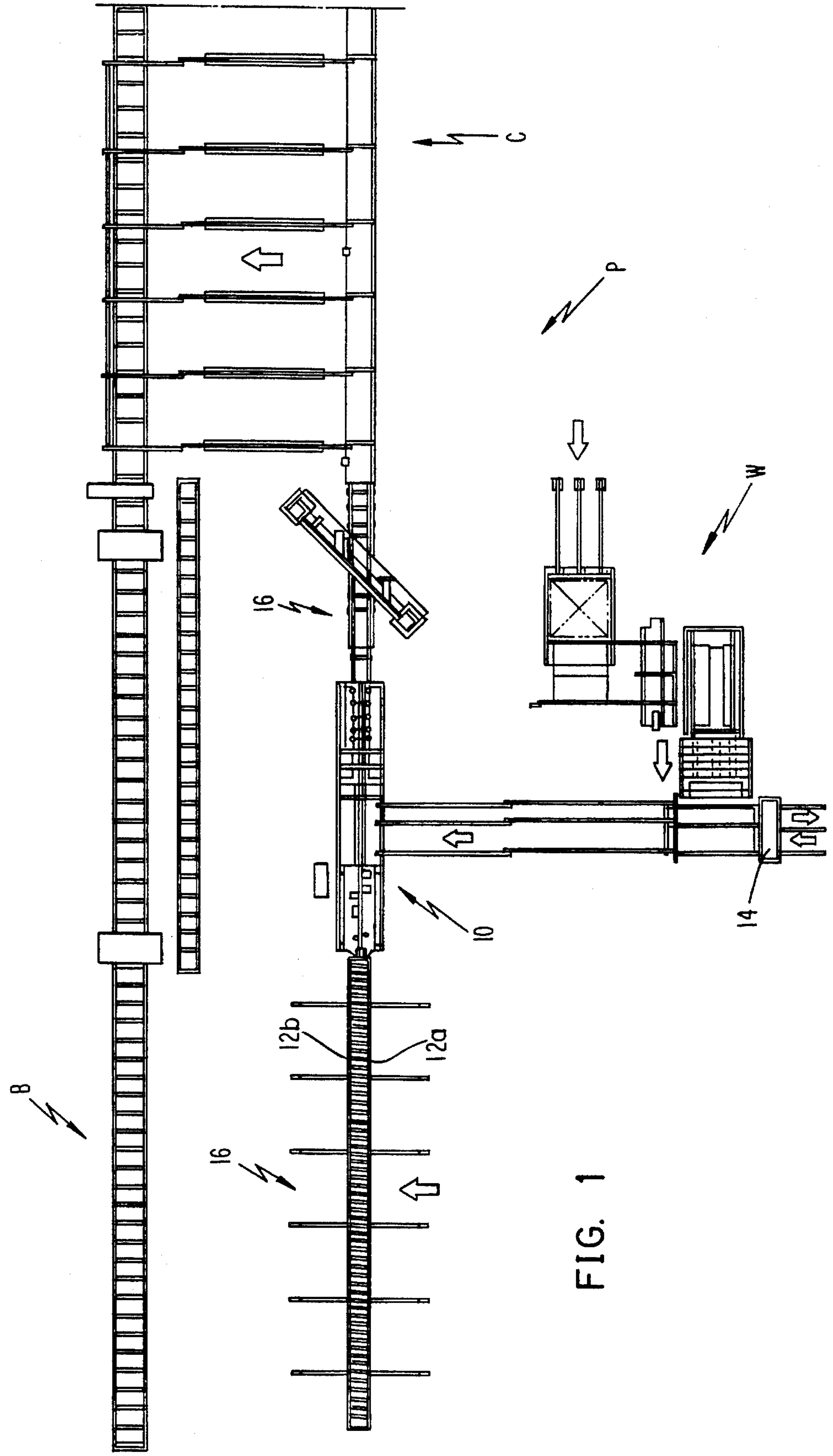
FIG. 1 is a schematic plan view of an overall production line assembly for manufacturing wooden I-beams.

FIG. 1 is an illustration of an overall production area P utilizing an assembly line 10 which is the subject of the present invention for making wooden I-beams 12 (see FIG. 20) having wood flanges or chords 12*a* and 12*b* ("flange(s)" and "chord(s)" are used interchangeably throughout this specification) and wooden web members 14. The assembly line or machine 10 performs different operations to secure the identical flanges 12*a*,12*b* to the series of webs 14 to form web-to-chord joints. Each web 14 is preferably formed of plywood or oriented strand board ("OSB" which is a form of flake board wherein strains of wood are oriented, overlapped and secured together by suitable glues to achieve strength properties superior to plywood) or the like. The webs 14 may be of varying thickness and, in the assembled wooden I-beam, form a plurality of abutted sheets of such boards. The sheets 14 are rectangular having a long dimension along a longitudinal axis which is substantially parallel to the longitudinal axes of the elongated flanges 12*a*,12*b*. The webs 14 form butt joints with one another preferably secured together with adhesive or glue.

Each flange 12*a*,12*b* has a generally rectangular or square cross-section perpendicular to its longitudinal axis. The flanges 12*a*,12*b* may be formed of commercially available wooden structural boards or may be formed of laminated veneer lumber ("LVL") which is readily available in a large variety of lengths and thicknesses. The flanges are cut from rectangular stock material and provided with grooves either off the assembly line 10 at a flange forming area in a known manner, or within the assembly line as described, infra. After forming off the assembly line, the grooved flanges (or ungrooved flanges as described infra) are discharged onto an outfeed table for transfer to a flange feed location via a lateral conveyor ramp. The flanges are respectively grouped on opposite sides of a roll case16 for feeding into the assembly machine 10 along opposite left and right hand sides thereof.

The individual web members 14 are pre-cut to desired length and width and undergo a beveling operation whereby their upper and lower longitudinal edges are beveled or tapered to respectively interfit with the flange groove as described below. The grooves preferably have the same cross-section as the web beveled edges or may have other cross-sections as known in the art. The web forming steps may occur off-line, as known in the art, in a web forming area generally designated by reference letter W. In that area, the web-to-web joints are also profiled. The formed webs 14 are conveyed to the assembly machine 10 for positioning as a stack within a web hopper located downstream from the flange infeed location.

Figures 2A, 2B:
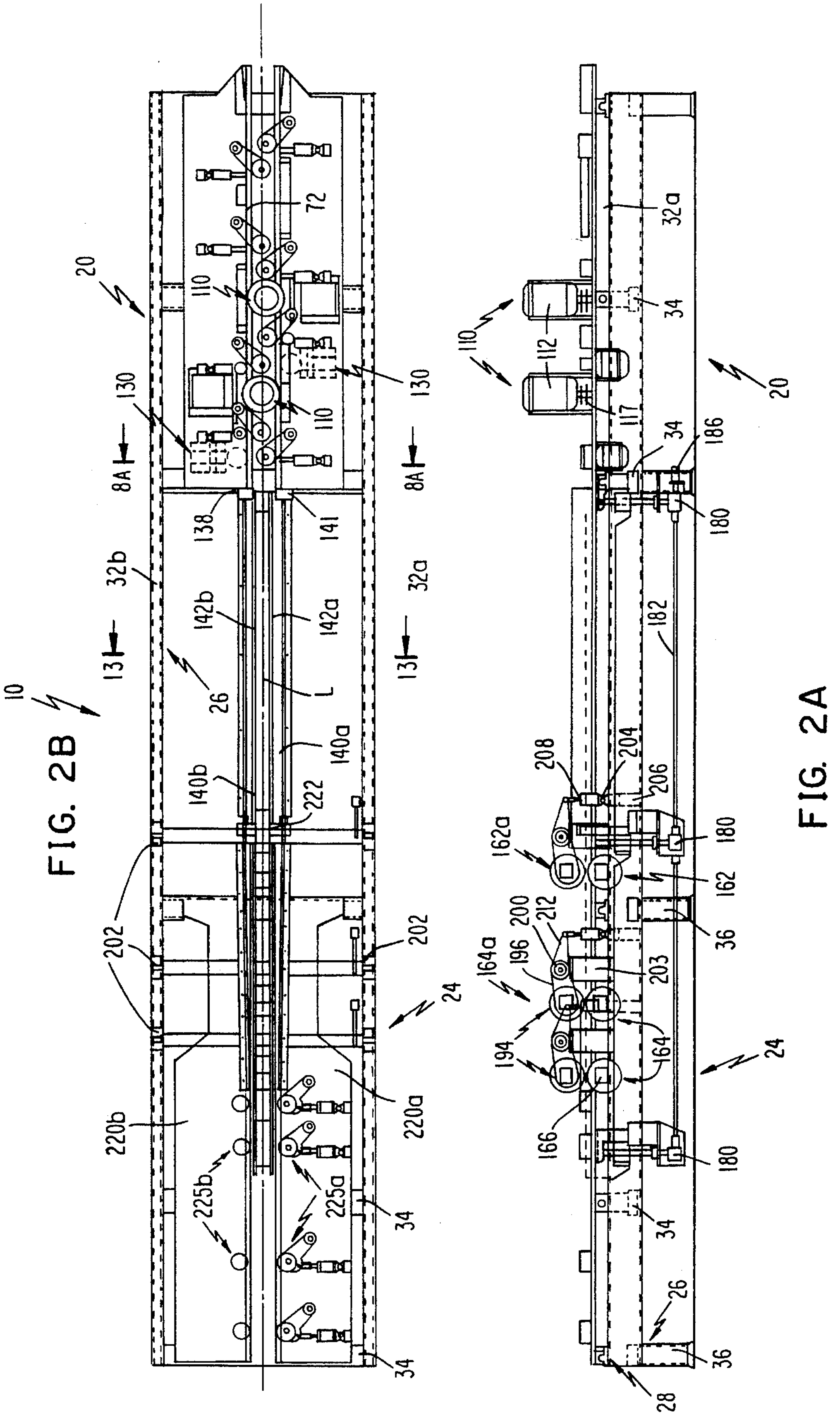
FIG. 2A is an elevational view of a wooden I-beam assembly machine to which the present invention is directed.
FIG. 2B is a top plan view of the wooden I-beam assembly machine of FIG. 2A.

The flanges 12*a*,12*b* are conveyed respectively along the opposite sides of the webs 14 which is formed as a continuous web in the assembly line 10. The flanges 12*a*,12*b* are gradually converged (in the area downstream from section lines 14—14 in FIG. 2B) towards the continuous web 14 so that the beveled edges enter the grooves to form press-fitted interconnecting joints therebetween and thereby the wooden I-beam. The beveled edges and grooves are preferably glued prior to joining. The wooden I-beam may optionally be passed through a radio frequency tunnel as is well known which cures the glued joints of the I-beam. The I-beam is discharged onto a outfeed table provided with a flying cutoff saw 16 cutting the beam to desired length. The cut beams are transferred laterally from the outfeed table by means of a cross-transfer conveyor C which provides a minimum cure dwell time before the beams are ultimately stacked and bundled at station B for subsequent shipment.

As mentioned above, the present invention is directed to the assembly line or machine 10 which contains a number of unique features providing for positive control over the flanges throughout the machine and which also allows the machine to be easily adjusted to accommodate different flange sizes and web widths and lengths in an accurate, quick and easy to set up manner on the production floor P. The I-beam assembly machine 10 of the present invention also features a control system in which the various web, flange, and beam power drives are interlocked through speed and pressure control loops which will enable the machine operator to manufacture wooden I-beams in which the flanges 12*a*,12*b* and webs 14 are joined together at controllable and settable speeds and forces to ensure uniform, reliable product integrity.

Assembly machine 10 of the present invention is comprised of three sections (see FIG. 2B): a flange infeed section 20 at the upstream end thereof; a web hopper feed area 22 in the center section thereof; and a beam outfeed section 24 at the downstream end thereof. The three sections 20–24 are all supported on a fixed, common machine frame 26 extending the entire length of the machine. A unique system of adjustable drive screw assemblies 28 (see FIGS. 8A,8B and 11A,11B) mounted to the frame at 26 longitudinally spaced intervals along the entire length of machine 10 are used to achieve center line justified adjustment of the flange and beam drive sets and supports throughout the machine, as discussed in detail below, to control set-up spacing between the flanges 12*a*,12*b* and allow for manufacture of wooden I-beams of varying height. The web top and bottom drive sets and web supports in the web center section 22 only, is vertically adjustable utilizing a unique series of column screws 30 (FIGS. 15 and 16) to easily adjust for webs of different thicknesses.

The fixed machine frame 26 which defines the support base of the machine 10 is comprised of a pair of parallel side frames 32*a* and 32*b* extending horizontally the full length of the machine along left and right hand sides thereof, respectively. These side frames 32*a*,32*b* are connected together at longitudinally spaced intervals with laterally extending horizontal braces or cross ties 34 which may be welded or bolted at opposite ends thereof to the frames. The resulting main frame assembly 26 is supported above a production floor space with vertical posts 36.

Flange Infeed Section

Figure 3:
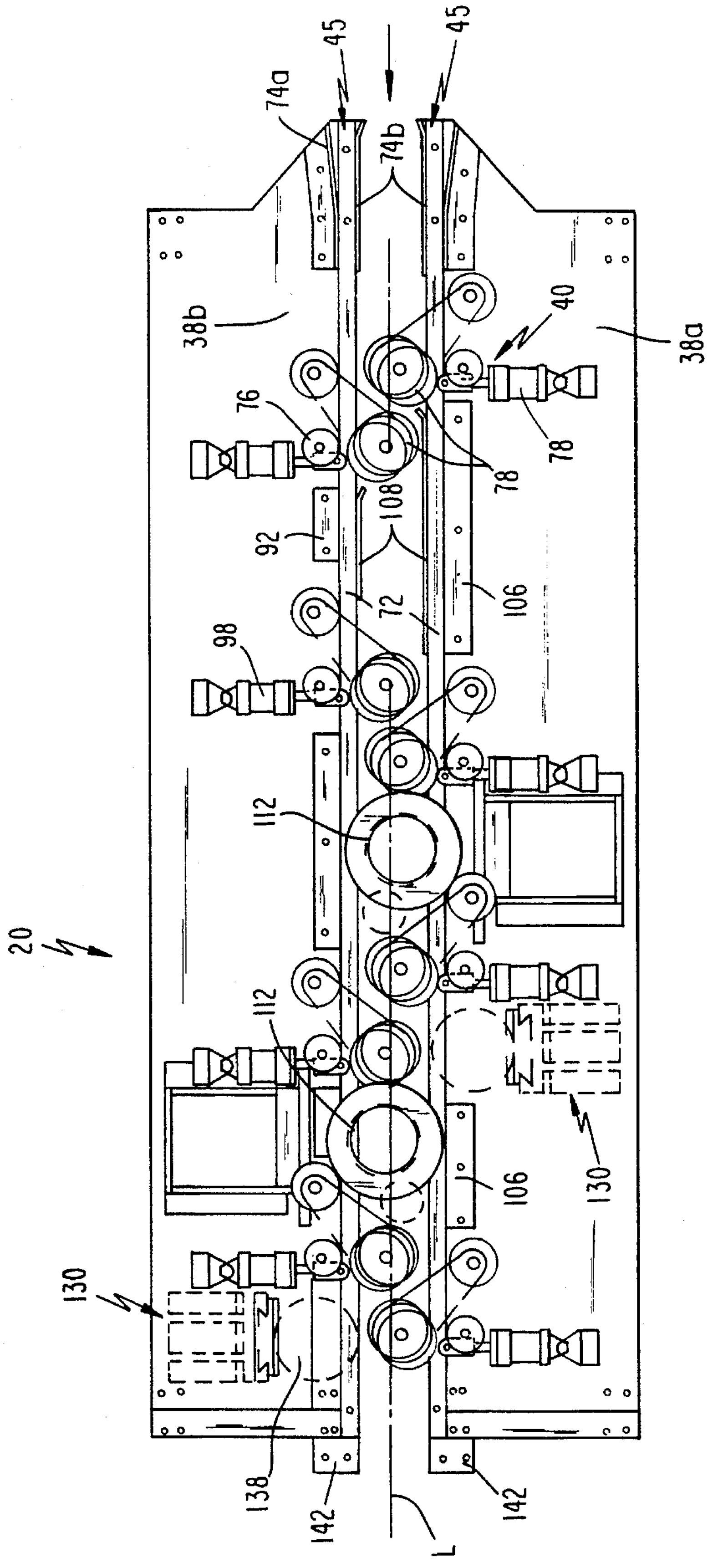
FIG. 3 is an enlarged plan view of a flange infeed section of the assembly machine.

With reference now to FIG. 3, the flange infeed section 20 is comprised of a pair of left and right horizontally extending infeed plates 38*a* and 38*b* which are adapted to support the flanges 12*a*,12*b* entering the machine from roll case 16 as well as the flange infeed drive roll assemblies 40 discussed, infra. As best depicted in FIG. 8A, the left and right infeed plates 38*a*,38*b* are movably mounted to the support base 26 for lateral adjustment through a pair of the adjustable lead screw drive assemblies 28 located at opposite ends of the infeed section.

Figure 8A:
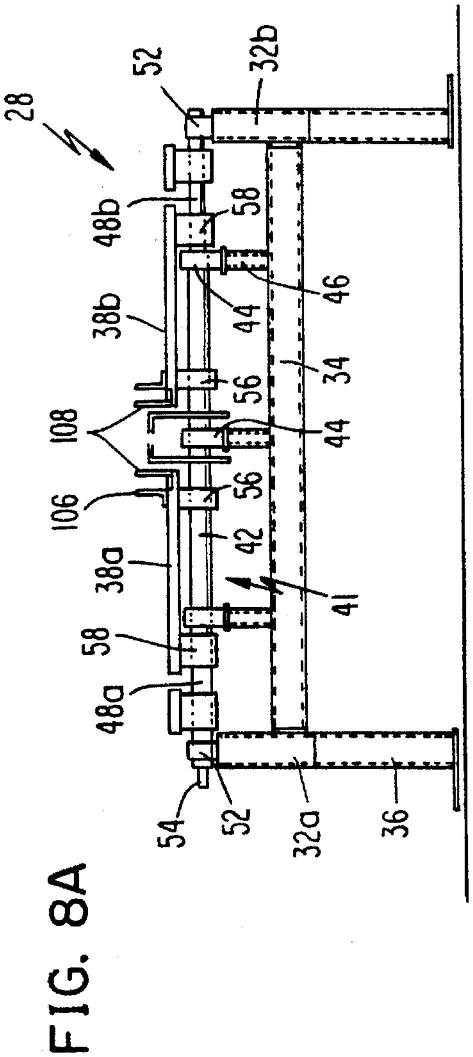
FIG. 8A is a sectional elevational view taken along the line 8A—8A of FIG. 2B to depict a lateral adjustment mechanism according to the invention.
Figure 8B:
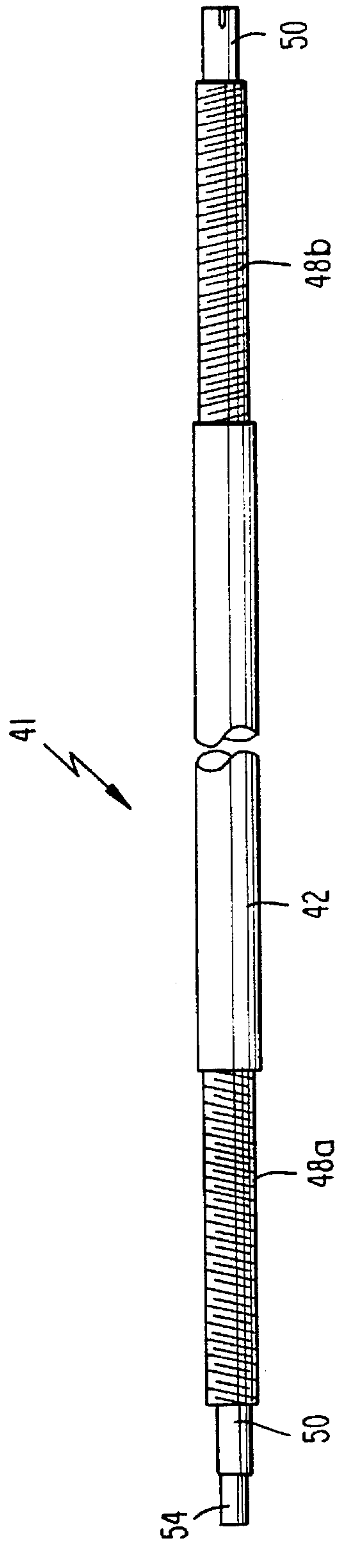
FIG. 8B is an enlarged detailed view of a lead screw of the lateral adjustment mechanism depicted in FIG. 8A.

With references to FIG. 8A and 8B, each drive screw assembly 28 includes a lead screw 41, which comprises a smooth or unthreaded center section rotatably supported on a cross tie 34 through a series of pillow block bearings 44 respectively fixed to the upper end of a support bar 46 projecting upwardly from the cross tie. The three pillow block bearings 44 rotatably support the smooth center section 42 of the lead screw 41 at opposite ends and the center section thereof. A right handed threaded portion 48*a* and a left handed threaded portion 48*b* are respectively formed outwardly adjacent the smooth center section 42. The outermost end 50 of each right and left threaded section 48*a*,48*b* is unthreaded and rotatably received within additional pillow block bearings 52 mounted to the left and right side frames 32*a*,32*b*. The outermost reduced diameter end 54 projecting from the unthreaded journal portion 50 of the right hand thread 48*a* constitutes a driven screw portion which is adapted to rotate each of the four lead screws in a common clockwise or clockwise direction throughout the machine in a synchronous manner, as discussed more fully below, to adjust the lateral spacing between flanges 12*a*,12*b* and therefore beam height.

Still with reference to FIG. 8A, the inboard or innermost lengthwise edge of each infeed plate 38*a*,38*b* supports a bushed block 56 which is slidably mounted on the smooth center section 42 of each lead screw 41 for smooth lateral sliding movement therealong. A lead screw nut 58 projects downwardly from the outboard or outermost lengthwise edge of each support plate 38*a*,38*b* for threaded engagement with the right and left threaded portions 48*a*,48*b* of the lead screws, respectively, to transmit lateral motion to each plate caused by the turning lead screws.

The above-described lead screw assemblies 28, each formed with right and left hand thread segments 48*a*,48*b* at opposite end portions thereof, extend in the lateral or width direction of the machine 10 and essentially provide the sole means of supporting the left and right infeed plates 38*a*,38*b* on the machine frame 26 as well as the corresponding left and right outfeed plates 220*a*,220*b* in the outfeed section 24 as will be discussed more fully below.

Figure 11A:
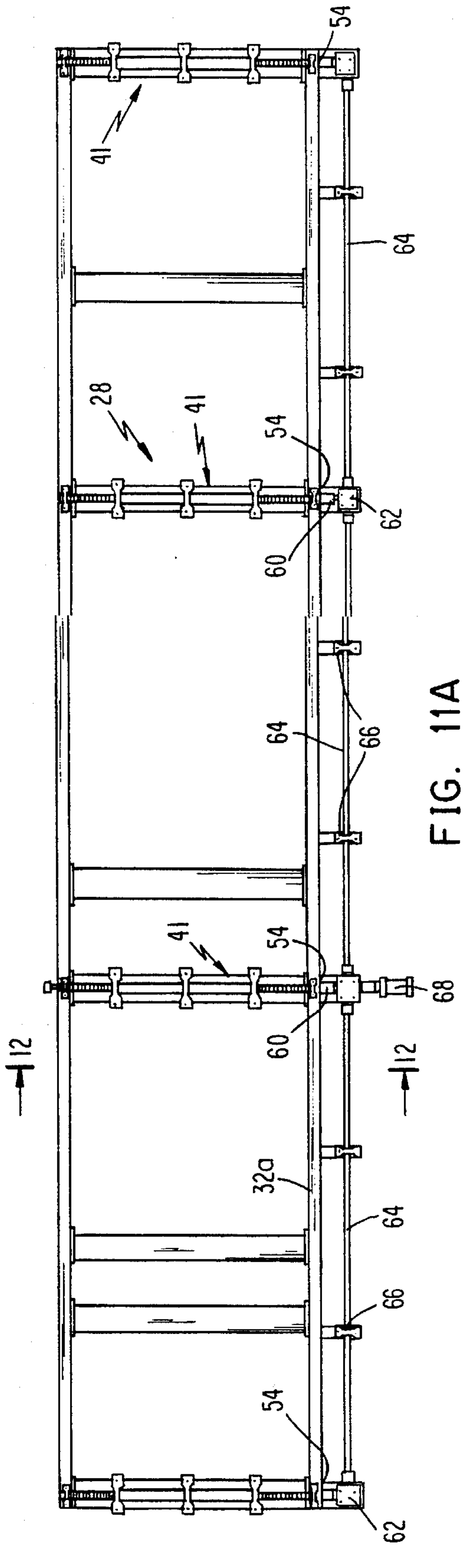
FIG. 11A is a top plan view of the machine base depicting the placement of the lead screw assemblies for providing center justified lateral adjustment.
Figure 11B:
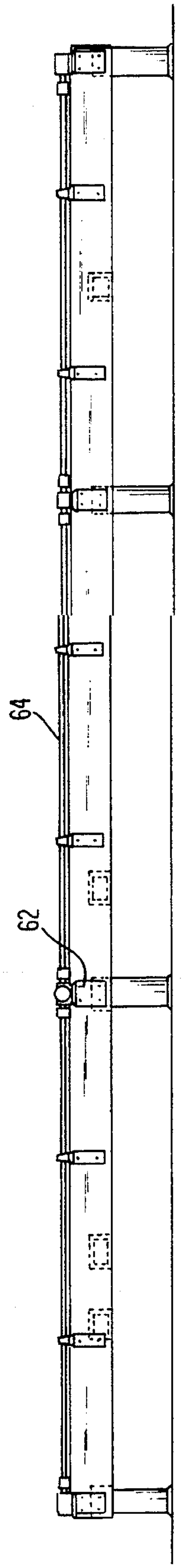
FIG. 11B is an elevational view of the lead screw assemblies of FIG. 11A.
Figure 12:
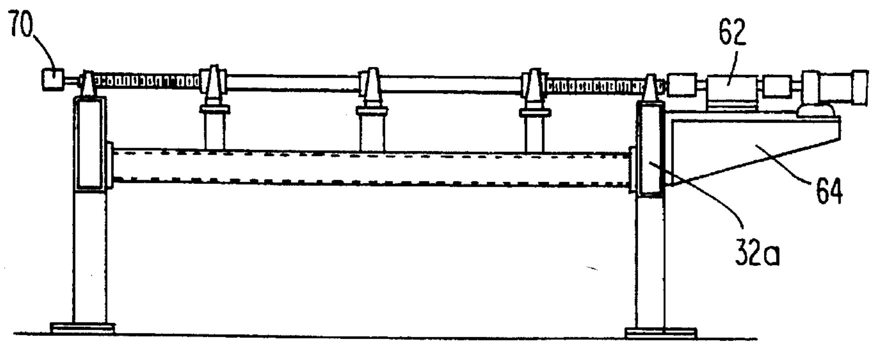
FIG. 12 is a sectional view taken along the line 12—12 of FIG. 11A.

With reference to FIGS. 11A, 11B and 12, the driven end portion 54 of each of the four lead screws 41 is connected through a coupling 60 to a right angle gear box 62 mounted to the left hand machine side frame 32*a* with a bracket 64. The gear boxes 62 respectively associated with each of the lead screws 41 are interconnected to each other through a series of drive shafts 64 and supporting pillow block bearings 66 to transmit rotative output from a hydraulic monitor 68 mounted to one of the gear boxes 62. An encoder 70 (FIG. 12) is mounted to the opposite end of the lead screw 41 directly driven by the motor. This arrangement advantageously allows for controlled, synchronous lateral center justified adjustment of the machine 10.

Figure 6:
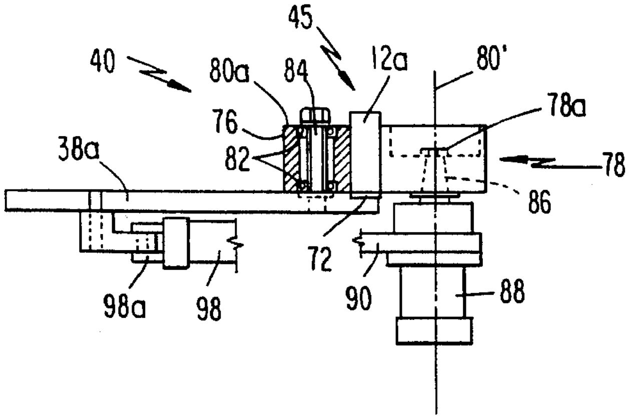
FIG. 6 is a further sectional view of an infeed vertical flange drive roll assembly.

In the infeed section 20, the left and right infeed plates 38*a*,38*b* solely support the flanges 12*a*,12*b* and the flange drive roll assemblies 40. The upper, inboard lengthwise edge surface of each infeed plate is machined with a step adapted to receive a bed plate insert 72 of hard cold-rolled steel strip which extends the full length of the infeed section 20 to respectively define a smooth slide surface supporting a narrow face of each flange 12*a*,12*b* entering the machine 10 from flange feeder 16 along a flange chute 45 having an entrance defined by a pair of converging angles 74*a* and vertical plates 74*b* located at the upstream end of the infeed section. As best depicted in FIG. 6, the vertically extending wide faces of each flange are adapted to be contacted by an outer idler roll 76 and an inner flange drive roll 78, each mounted to an associated one of the infeed plates 38*a*,38*b* for rotation about vertical axes 80.

Controlled rotation of the lead screw assemblies 28 in either the clockwise or counter-clockwise direction results in simultaneous inward or outward lateral movement of each infeed plate 38*a*,38*b* in relation to the central longitudinal axis L of the machine 10. This enables the spacing between the flange guide paths defined by the bed plate insert strips 72 and the paired sets of vertical flange idler and drive rolls 76,78 to allow for manufacture of wooden I-beams nominally of 9 inches wide to about 24 inches wide. The feature of providing for center line adjustment in the unique manner set forth hereinabove advantageously eliminates the need for drive systems and width adjustment systems which require universal spline joints and sliding spline drives as known in the prior art. Another advantage of center line adjustment is the ability to utilize a single web hopper drive that may be laterally immovably mounted along the machine center line L to eliminate the need for a web drive system that is laterally openable with universal joints. The web hopper feeder herein, as will be seen below, is center line registered without the need for web feeding mechanisms which are adjustable in the width or lateral direction.

With reference to FIG. 3, there are four flange drive assemblies 40 mounted exclusively to each of the left and right infeed plates **38*a*,38*b* at longitudinally spaced locations to drive the individual flanges 12*a*,12*b* along the infeed section 20 into the web hopper center section 22. FIGS. 4–7 are illustrations of one of the identical flange drive assemblies 40 defining each flange chute 45. With reference to FIG. 6, each flange drive roll assembly 40 is comprised of idler roll 76 having vertical axis of rotation 80 and which is mounted to the top surface of each infeed plate 38*a*,38*b* through a pair of roller bearings 82 encircling a hub 84 bolted to the plate outwardly adjacent the bed plate insert 72 defining the flange slide path of each chute 45**.

Figure 4:
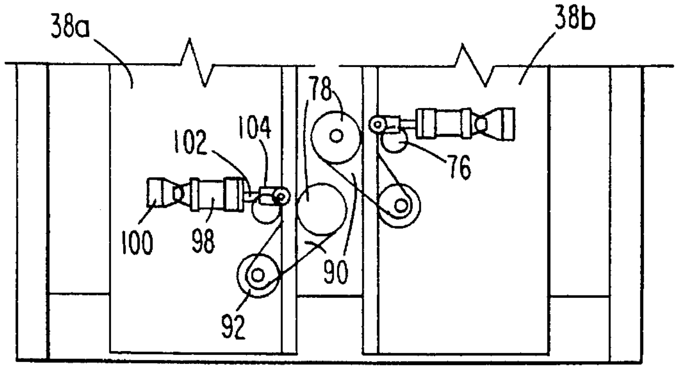
FIG. 4 is a detailed bottom plan view of a portion of the infeed section to depict infeed vertical flange drive rolls.
Figure 5:
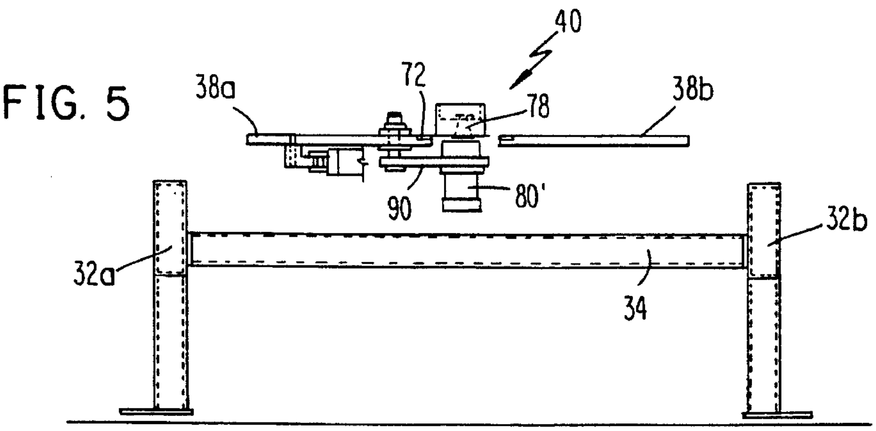
FIG. 5 is a partial elevational sectional view of an infeed flange drive assembly of FIG. 4.
Figure 7:
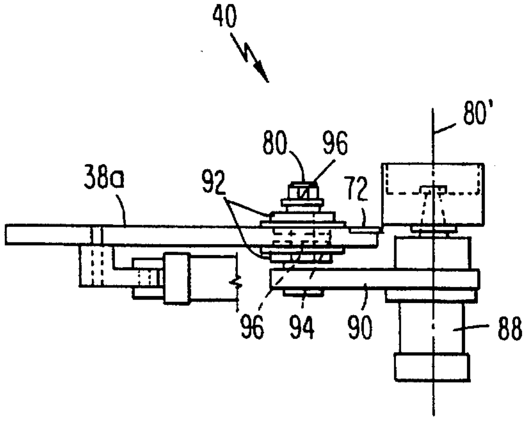
FIG. 7 is an enlarged, partly schematic and partly sectional view similar to FIG. 5.

The associated flange drive roll 78 is swingably mounted to the associated infeed plate **38*a*,38*b* so as to be inwardly adjacent the inboard longitudinal edge of the corresponding flange slide path. As best depicted in FIGS. 4–7, each flange drive roll 78 has a vertical axis of rotation 80' defined by a tapered output shaft 86 of a hydraulic motor 88 mounted to one end of a pivot or swing arm 90 extending parallel to and below the associated infeed plate 38*a*,38*b*. As best depicted in FIGS. 4 and 7, the opposite end of each swing arm 90 is pivotally connected to the associated infeed plate 38*a*,38*b* by means of upper and lower piloted flange bearings 92 respectively received in cylindrical recesses 94 formed in top and bottom surfaces of the infeed plate and bolted to the pivot arm through a pin and nut arrangement 96. A hydraulic cylinder 98 having a cylinder end 98*a* pivotally mounted to the lower surface of the associated infeed plate 38*a*,38*b* with a bracket 100 has a piston rod 102 pivotally connected to the swing arm 90, through a clevis and pin arrangement 104 (Figure adjacent to the hydraulic motor 88. Hydraulic actuation of these pinch cylinders 98 operates to pivot the associated inner vertical flange drive rolls 78 into and out of contact with the inner wide face of the flange 12*a*,12*b*** traveling on the slide path.

The feature of driving the flanges **12*a*,12*b* through the machine with vertical flange drive roll assemblies 40 advantageously results in greater surface contact between the roll surfaces and the wider faces of the flanges, as opposed to prior art horizontally arranged rolls engaging the narrower flange faces with less traction. The use of hydraulic motors 88 with tapered shafts 86 minimizes the need for precise clearances since each drive roll 78 can be securely tightened to the tapered shaft simply by tightening the nut 78*a***. Of course, straight shafts and other suitable means may be used in place of tapered shafts.

As depicted in FIG. 3, a series of angles 106 bolted to the top surface of each infeed plate **38*a*,38*b* between adjacent idler rolls 76 assist in defining the outer extent of each flange chute 45 extending through the infeed section 20. The opposite, inner lengthwise extent of each flange chute 45 is defined by the vertical drive rolls 78 and additional vertical plates 108 mounted to the inner lengthwise edge of the infeed plate between the drive rolls. This technique of defining the flange chutes 45 with inner vertical plates 108 and outer angles 106 is common throughout the machine 10** as will be apparent from FIG. 2B.

In accordance with a further feature of the invention, the idler rollers 76 are preferably rotatable about axis 80 which is tilted or canted downwardly in the direction of conveyance at approximately one-half to one degree from a vertical plane which extends in the width or lateral direction of the machine while maintaining full face contact with the flange vertical faces. As a result of extensive experimentation, it has been discovered that the resulting tilted roll surface **80*a* of each idler roll 76 functions to hold the flange members 12*a*,12*b* down against the bed plate 72** which eliminates the need for top rollers or hold-down members exerting a hold-down force against the narrower top faces of the flanges. This simplifies machine design and manufacturing cost.

Figure 9:
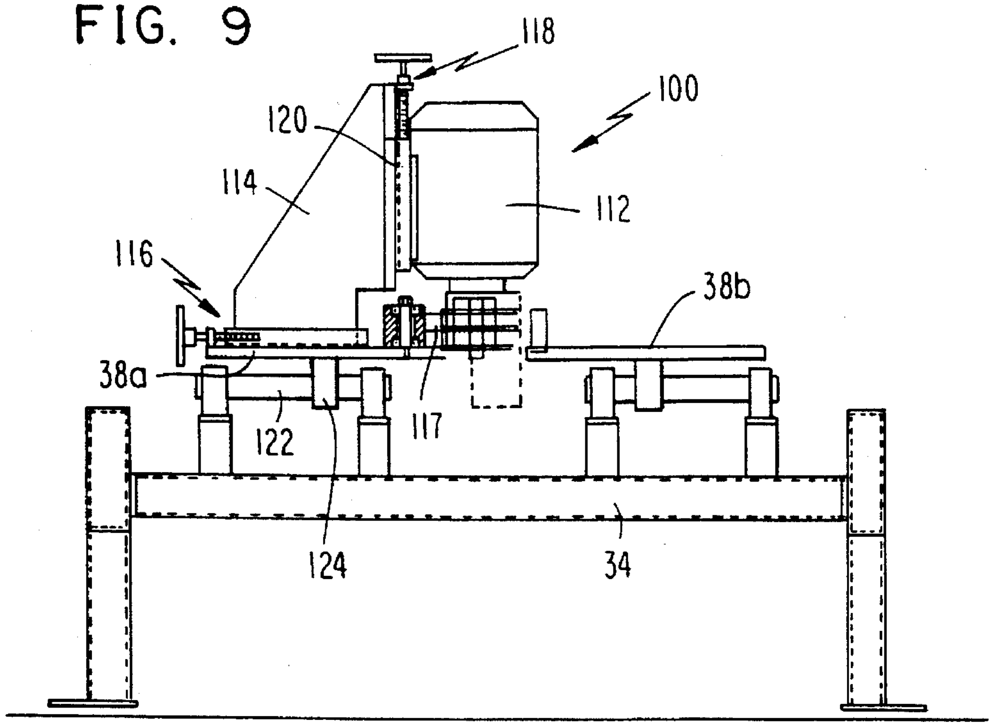
FIG. 9 is a sectional view, partly schematic, of a flange groove cutter and inside edge easer assembly in the infeed section of the machine.

The infeed section 20 also features a pair of flange groove cutters 110 (FIGS. 2A, 2B, 3 and 9) which are respectively mounted to the left and right infeed plates **38*a*,38*b* to form a longitudinal groove in each inward facing, vertical wide flange face as the flanges 12*a*,12*b* are conveyed towards the downstream end of the infeed section. As best depicted in FIG. 9, each cutter 110 has a cutter motor 112 mounted to a motor mount 114 secured to the top surface of the associated infeed plate 38*a*,38*b* through an adjustment screw mechanism 116 permitting lateral adjustment of the cutter head 117 projecting downwardly from the cutter motor. A second adjustment screw mechanism 118 allows for vertical adjustment of the cutter head 117 along a slide 120. The weight of each cutter motor 112 may be supported on the infeed plate 38*a*,38*b* with a smooth slide shaft 122 which is mounted to extend laterally above and supported on an associated machine frame cross tie 34 as depicted in FIG. 9. A slide block 124 secured to project below the associated infeed plate 38*a*,38*b* is received on the slide shaft 122 to support the weight of the cutter assembly 110. In this manner, the cutter heads 117 are automatically movable via the slide shafts 122 with the associated infeed plate 38*a*,38*b* during beam height adjustment while being capable of independent vertical and lateral adjustment as discussed above. Cutter motor 112** also supports a pair of edge easer tools for inside edge easing.

Figure 10:
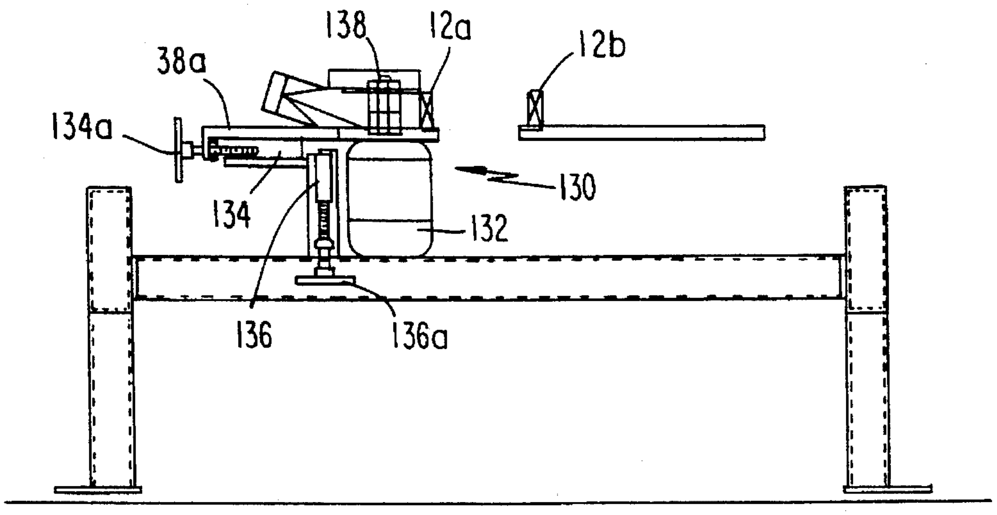
FIG. 10 is an elevational sectional view of an outside flange edge easer assembly in the infeed section.

FIG. 10 is an illustration of a cutter edge easer 130 having an edge easer motor 132 mounted to and below an associated one of the infeed plates **38*a*,38*b* downstream from the associated groove cutter 110 (see FIG. 3) through an infeed plate slide 134 and an edge easer slide arrangement 136 which allows for lateral adjustment (through an adjustment screw 134*a*) and vertical adjustment (through an adjustment screw 136*a*), both relative to the infeed plate, of the cutter edge easer head 138** projecting upwardly from the infeed plate into contact with the outer wide flange face.

Web Hopper Feed Area (Machine Center Section)

Figure 13:
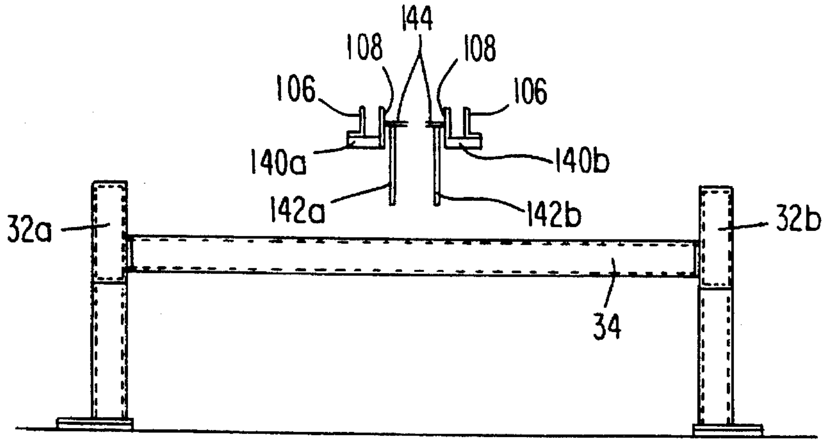
FIG. 13 is a sectional elevational view taken through the line 13—13 of FIG. 2B depicting only the relative location of the left and right flange chutes and the web bottom support rails.

FIG. 13 is a sectional view illustration of the left and right flange chutes 45 within the web hopper infeed or center section 22 of the machine 10. Therein, each chute bottom is defined by a left and right slide bar **140*a* and 140*b*, each respectively having upstream ends which are bolted at 141 to the downstream ends of the infeed plates 38*a*,38*b* and particularly to downstream projecting stepped end portions of each infeed plate as best depicted in FIG. 3, and downstream ends bolted to upstream ends 222 of the outfeed plates as discussed more fully below. The slide bars 140*a*, 140*b* perform the same function as the bed plate inserts 72 in the machine infeed section 20 and thereby define a continuous slide surface with the inserts to provide smooth, uninterrupted support for the flanges 12*a*,12*b* without utilizing bottom rollers within the flange chutes 45. Such rollers, as known in the art, tend to subject the flanges to undesirable vibration and bounce, unlike the smooth slide surfaces provided within the flange chutes 45** of the present invention.

As mentioned hereinabove, angles 106 bolted to the top surface of the slide bars 140*a*,140*b* define the outermost extent of each flange chute 45 while vertical plates 108 secured to the inward facing longitudinal edge of each slide bar define the inwardmost extent of each chute. Therefore, the flanges 12*a*,12*b* being driven through the infeed section 20 via the flange infeed drive roll assemblies 40 slide smoothly through their respective chute 45 defined between these members 106,108 and 140*a* or 140*b* without bouncing or vibration.

The vertical plates 108 defining the inwardmost extent of each flange chute 45 also serves to define the web side engaging plates within the center section 22. By virtue of their attachment to the slide bars 140*a*,140*b*, these plates 108 are obviously laterally adjustable through the unique lead screw assemblies 28 described hereinabove to accommodate beam height adjustments occurring as a result of using different web widths.

The webs 14 are supported for movement within the center section 22 through a pair of bottom slide rails 142*a* and 142*b* which extend longitudinally between the web side engaging plates 108. These rails 142*a*,142*b* present smooth upper edges 144 defining a horizontal web support ramp supporting the webs in smooth sliding engagement.

Figure 14:
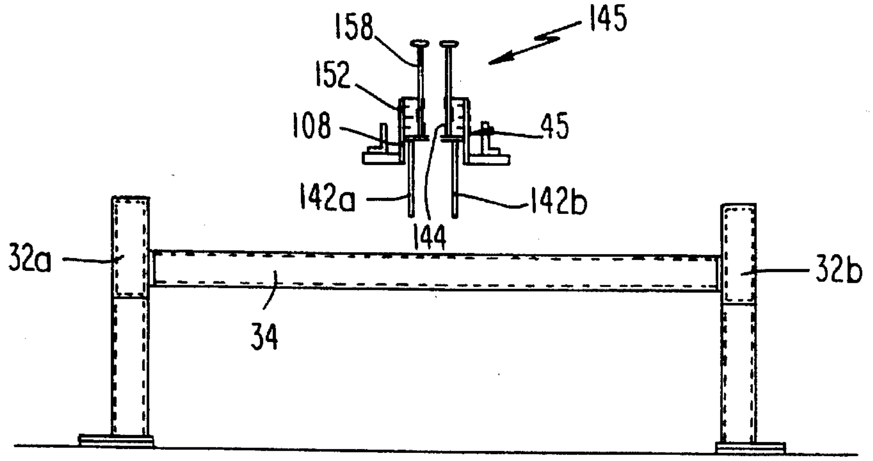
FIG. 14 is a view similar to FIG. 13 taken through a web feeder gate area.

FIG. 14 is an illustration of a web hopper feeder gate 145 against which a stack of webs 14 are maintained within the web hopper to allow for controlled sequential feeding of a bottommost web 14' in the stack utilizing a lugged web feeder chain assembly 150 (FIGS. 15 and 16) mounted to and between the support rails 142*a*,142*b* in the manner described below. The feeder gate 145 is comprised of a pair of identical feeder sides 152 respectively mounted to the inward facing vertical surface of the web hopper side plates 108. These feeder sides 152 are formed with an upstream facing surface 154 (FIG. 15) against which the leading edges of the webs 14 in the stack are positioned until they descend to the bottommost stack position below the bottom surface 156 of each side. Since the web bottom supporting rails 142*a*,142*b* are vertically adjustable in the unique manner described below, relative to the non-vertically adjustable flange chutes 45, each feeder side 152 supports a vertical adjustment screw 158 having a lower end 160 which can project down from the bottom surface 156 of each feeder side. Thus, when the web bottom support rails 142*a*,142*b* are adjusted to a lower position, the adjustment screws 158 are correspondingly manually (or automatically) adjusted so that the vertical height of the gate 145 defined between the screw bottoms 160 and the upper web support edges 144 of the rails is slightly greater than the thickness of one web 14 but less than twice the web thickness to ensure singular web feeding in a controlled manner.

Figure 16:
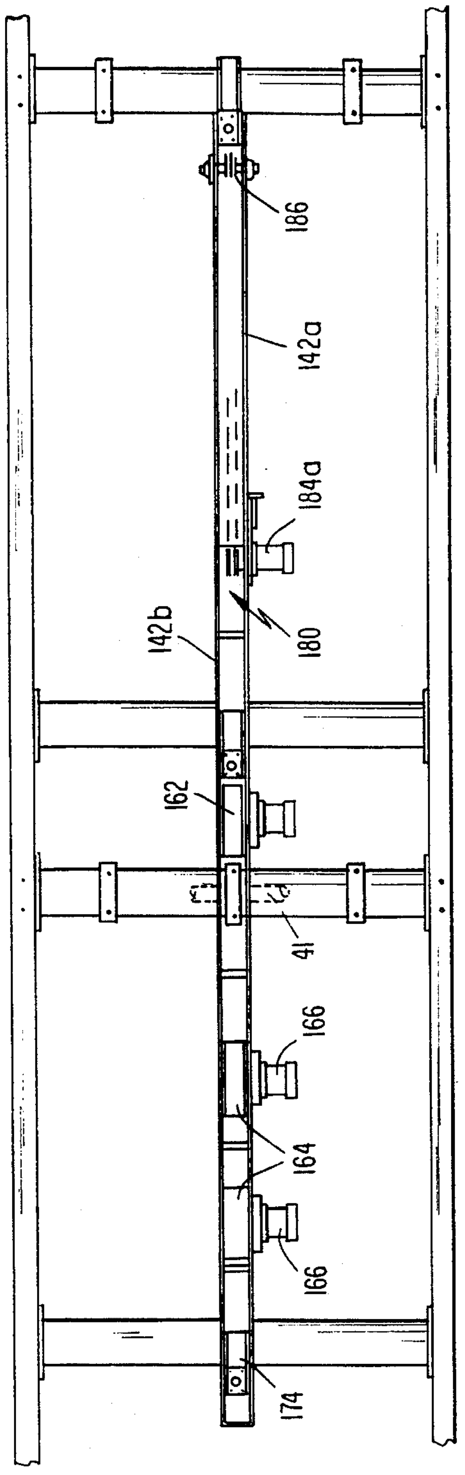
FIG. 16 is a top plan view of the web bottom support rails of FIG. 15 as well as the web bottom run-up and traction rolls and lugged web chain feed assembly carried on said support rails.
Figure 15:
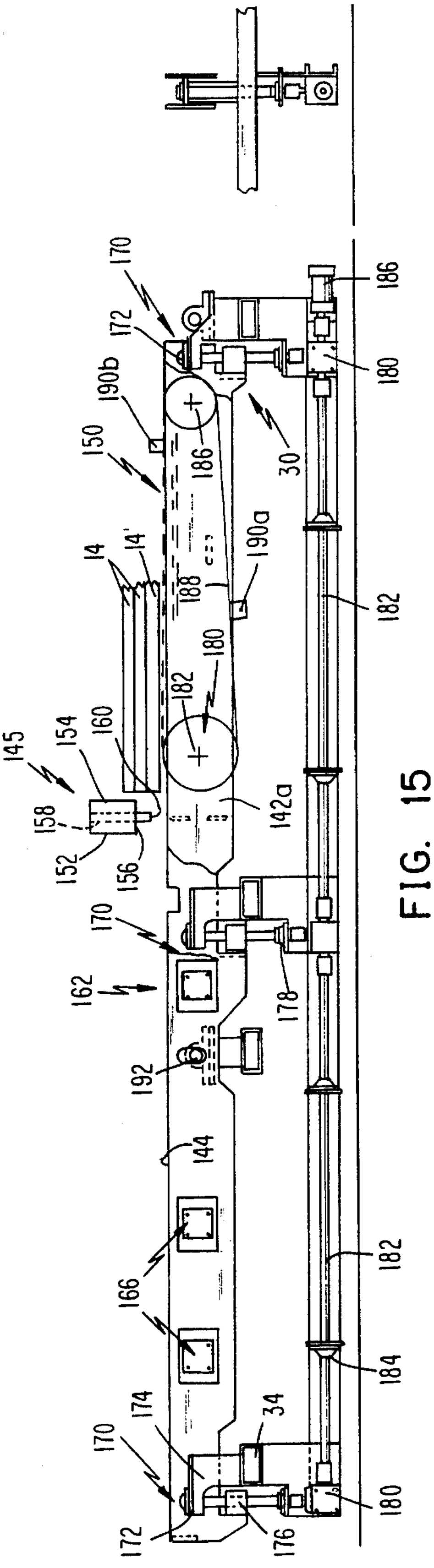
FIG. 15 is an exploded elevational view of a series of column lead screw assemblies for providing vertical or height adjustment of the web support rails.

FIGS. 15 and 16 are illustrations of the web bottom support rail arrangement which is also used to support a web bottom run-up roll 162 and a pair of longitudinally spaced web bottom traction rolls 164 mounted downstream from the run-up roll. As best depicted in FIG. 16, each of the run-up and traction rolls 162,164 is driven through a hydraulic motor 166 bolted to the left hand web bottom support rail 142*a*. The web feeder gate 145 is located upstream from run-up roll 162 and the lugged web feed chain assembly 150 is disposed between the support rails 142*a*,142*b* upstream from the gate 145 as described more fully below.

From the foregoing, it can be seen that the web bottom support rails 142*a*,142*b* also support the web run-up and traction rolls 162,164 as well as the lugged web feed chain assembly 150 which must be capable of vertical but not lateral adjustment to accommodate different flange sizes. To that end, in accordance with a further unique feature of the inventions three vertical column lead screws 170 are located at opposite ends and at the center section of the support rails 142*a*,142*b*. As best depicted in FIG. 15, the upper end of each column screw assembly 170 is received within a flanged top bearing 172 rotatably mounted in a stationary upright support 174 attached to one of the machine frame cross ties 34. The intermediate threaded portion of the column screw 170 threadedly engages a screw nut 176 which is secured to and extends between the web bottom support rails 142*a*,142*b*. The lower end of each column screw 170 is received in a flanged bottom bearing 178, identical to the top bearing 172, which is in turn coupled to an output shaft 179 of a right angle gear box 180. The right angle gear boxes 180 associated with each column screw adjustment assembly 170 are interconnected to each other with drive shafts 182 and connecting support hub assemblies 184, all driven through a single hydraulic motor 186.

The unique column screw assemblies 170 of the invention essentially perform two functions. One function is to provide for controlled vertical or elevational adjustment of the web bottom support rails 142*a*,142*b* and the web run-up and traction rolls 162,164 as well as the lugged web feed chain system 150 supported thereon. A second function is to provide an effective means for transference of the tremendous lateral forces generated, when the webs 14 mate with the flanges 12*a*,12*b*, from the web bottom support rail system 142*a*,142*b* to the stationary machine base frame 26. These lateral forces are actually backup forces having a force vector component extending in the upstream direction opposite the downstream direction of web conveyance. These forces are transmitted as radial thrust loads from the column screws through their top and bottom flange bearings 172,178 and the screw nut 176.

In accordance with a further feature of the invention, each column screw 170 is preferably about two inches in diameter and provided with six threads per inch. This will allow the web bottom slide rails 142*a*,142*b* to be accurately vertically positioned (preferably with a digital readout) while allowing the threads to absorb a large backup force load since the column screws have a diameter which is about five times the diameter of a screw which this thread pitch is normally associated with.

The lugged web feed chain assembly 150 is mounted to and between the web bottom support rails 142*a*,142*b*, as best depicted in FIGS. 15 and 16, upstream from the web feeder gate 145 and between the center and upstream column screws 170. The lugged chain assembly 150 is essentially comprised of a head sprocket 180 rotatable about a laterally directed, horizontal axis 182 and directly connected to a hydraulic motor 184*a* mounted to the left hand web bottom support rail 142*a*. The upstream end of the chain feed assembly 150 is defined by a smaller diameter tail sprocket 186 mounted to and between the web bottom support rails 142*a*,142*b*. A lugged chain assembly 188 is trained around both the head drive and tail sprockets 180,186 and carries a pair of lugs 190*a*,190*b* having a web engaging face protruding upwardly from the upper edges 144 of the web bottom support rails 142*a*,142*b* when each lug travels in the downstream direction of web conveyance along the upper run of the chain feed assembly.

In the preferred embodiment, the lugs 190*a*,190*b* are spaced from each other and controlled so that the lugged web feed chain system 150 can accept four or eight foot in length web members 14 without mechanical adjustment. A stack of webs 14 is positioned in the web hopper feeder defined by the web side engaging plates 108, the web feeder gate 145, and the web bottom support rails **142*a*,142*b*. If the webs 14 are eight feet in length, the second lug 190b is positioned to be slightly upstream from the web trailing edges. Therefore, the tail sprocket 186 is preferably mounted so as to be located slightly greater than eight feet from the web feeder gate area 145. As the second lug 190*b* is advanced forwardly into contact with the trailing edge of the bottommost web 14', it advances the bottommost web, through the feeder gate 145 and then forwardly for approximately eighteen inches until the leading edge of the advancing web 14' engages the web run-up or speed-up roll assembly 162** which is nominally located about eighteen inches downstream from the web feeder gate area.

If four foot long webs are being fed through the assembly machine 10, after the first lug **190*a* feeds the bottommost web 14 through the web feeder gate 145 and into the web run-up roll assembly 162, the direction of rotation of the chain assembly 188 is reversed to allow the first lug to reverse direction (i.e., move in the clockwise direction) for approximately 18 inches allowing the next web 14' of the stack to drop onto web rails 142*a*,142*b*; then the chain assembly reverses into the counter-clockwise direction to feed the next web in order to prevent large gaps between adjacent webs. In the case of eight foot web lengths, however, the second lug 190*b* is returned back to its home position without reversely rotating the lugged feed chain assembly 150. Since the head sprocket drive motor 184** has an encoder feedback, it may be electronically controlled to allow for precise detection of lug positioning.

As further depicted in FIGS. 15 and 16, it can be seen that the web bottom support rails **142*a*,142*b* which are adjustable in the vertical direction via rotation of the unique column screw assemblies 170 discussed supra, respectively contain a pair of aligned vertically elongated slots 192 through which one of the four lead screw assemblies 41 extends. As discussed above, these lead screw assemblies 41 control lateral adjustment of the slide plates 140*a*,140*b* which support the flanges 12*a*,12*b* without affecting the vertical adjusting movement of the web bottom support rails 142*a*,142*b***.

Figure 18:
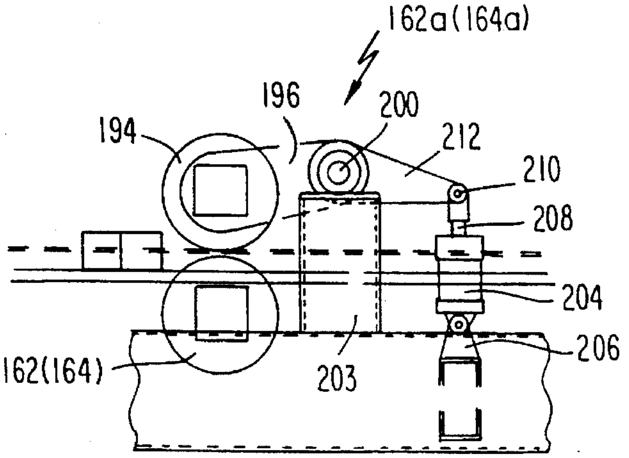
FIG. 18 is a side elevational view of a matched pair of web top and bottom traction or run-up rolls as depicted in FIG. 17.
Figure 17:
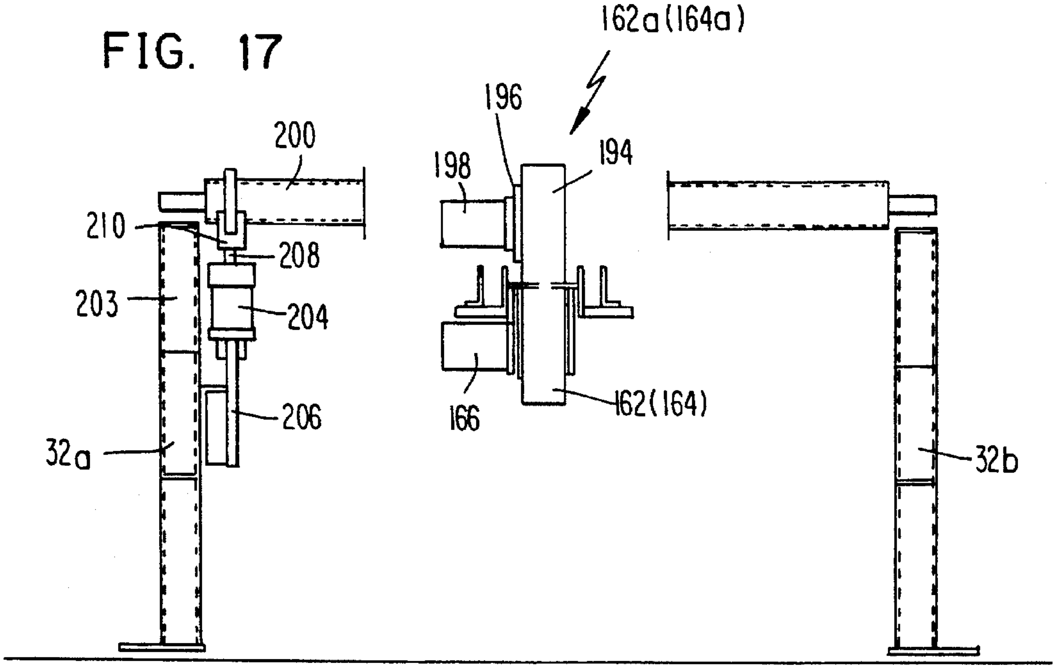
FIG. 17 is an elevational view, partly in schematic form, depicting a matched pair of top and bottom web run-up or traction rolls in the web drive assembly of the invention.

FIGS. 17 and 18 are illustrations of an upper web speed-up drive wheel assembly **162*a* associated with the web bottom speed-up roll 162, and is substantially identical to the upper web drive wheel assembly 164*a* associated respectively with each of the two web bottom drive roll assemblies 164 all of which are positioned within a four foot interval or other suitable interval so as to simultaneously engage the smallest length web member which may be run through the machine 10. Each of the upper web drive roll assemblies 162*a*,164*a* is comprised of a drive roll or wheel 194 mounted to and extending between a pair of laterally spaced parallel wheel arms 196. A hydraulic drive motor 198 (which may be identical to motor 166) is bolted directly to one of the wheel arms 196 to provide direct drive to the upper wheel 194. The opposite corresponding ends of the wheel arms are mounted to a pivot shaft 200 which extends laterally the full width of the machine 10. As best depicted in FIG. 17, one end of the pivot shaft 200 is rotatably mounted to the right hand machine side frame 32*b* through a pillow block bearing 202 secured to an upright 203 (see FIG. 2B) while the other end of the pivot shaft is also rotatably mounted through a pillow block bearing 202** to the left hand machine side frame through another upright.

A hydraulic pinch cylinder 204 is pivotally secured to the left hand machine side frame **32*a* through a cylinder mount bracket 206 and the upwardly projecting piston rod 208 is pivotally connected with a clevis and pin arrangement 210 to the rearwardly projecting distal end of a cylinder arm 212 which is attached at its opposite end to the pivot shaft 200. This cylinder 204 may be actuated to raise and lower its corresponding upper web drive wheel 162*a* or 164*b* between engaged and disengaged positions relative to the web line. The pivotal nature of these overhead rolls 194 advantageously allows the machine operator to control the degree of pinching force exerted by the rolls against the webs 14 in cooperation with the bottom web drive run-up and traction rolls 162,164** discussed, supra.

Beam Forming and Outfeed Section

Figure 19:
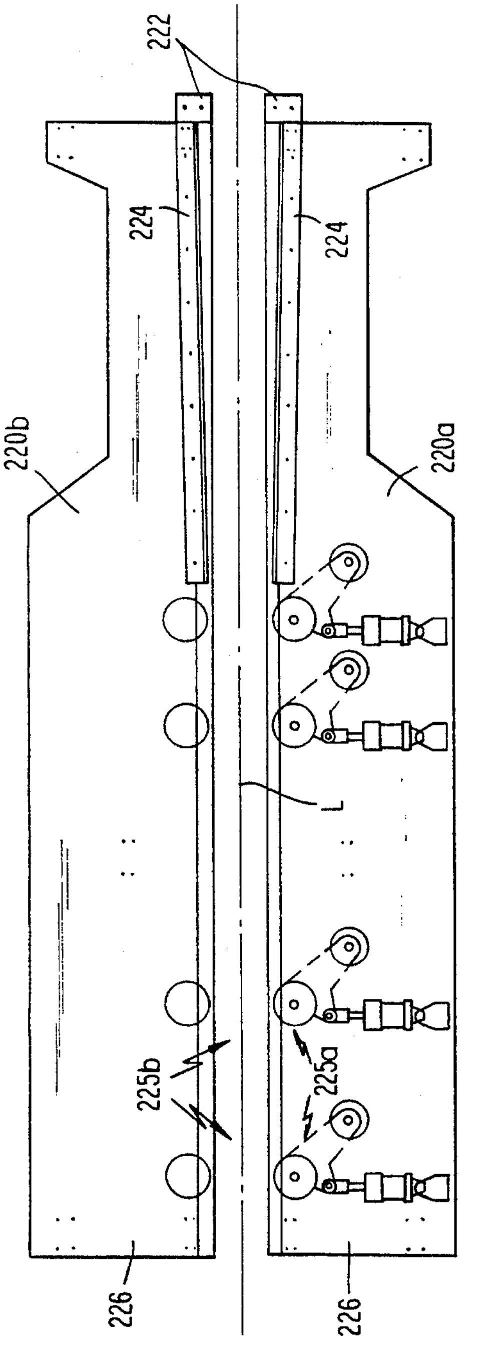
FIG. 19 is an enlarged top plan view of an outfeed section of the machine.

FIG. 19 is a plan view illustration of the outfeed section 24. Therein, it can be seen that the outfeed section is comprised of a pair of left and right hand horizontal outfeed plates **220*a* and 220*b* which are respectively formed, at upstream ends thereof, with a pair of projections 222 enabling the outfeed plates to be connected to the downstream ends of the center section slide plates 140*a*,140*b* to provide a continuous, substantially uninterrupted smooth slide surface defining each flange chute bottom. A pair of angles 224 are respectively secured to the top surface of the outfeed plates 220*a*,220*b* to continue the left and right hand flange chutes by providing a vertical surface engaging the outer vertical face of the associated flange 12*a*,12*b* moving through the machine 10 under the action of the vertical flange drive roll assemblies 40** discussed, supra.

With reference to FIGS. 11A and 11B, it can be seen that the downstream end of the outfeed plates **220*a*,220*b* are supported for lateral sliding adjustable movement by one of the downstream most located lead screw drive assemblies 28. Downstream end portions 226 of the outfeed plates 220*a*,220*b* are respectively mounted to this lead drive screw assembly 28 in the same manner as depicted in FIG. 8 in connection with the left and right hand infeed plates 39*a*, 38*b*. The upstream end of outfeed plates 220*a*,220*b* are supported by the upstream adjacent lead screw assembly 28**.

In FIG. 19, it can be seen that the angles 224 defining the outermost vertical guide edge of each left and right flange chute 45 gradually converge inwardly in the direction of the machine center line L so that the flanges **12*a*,12*b* are gradually conveyed into respectively contact with the lengthwise web edges to form the beam. As the flanges are joined to the web lengthwise edges, the resulting beam is engaged by a set of left and right hand, powered vertical flange (or beam) outfeed roll assemblies 225*a* and 225*b***, four on each side, which cooperate to apply a laterally inwardly directed pinching force to firmly press the flanges and webs together.

Figure 21:
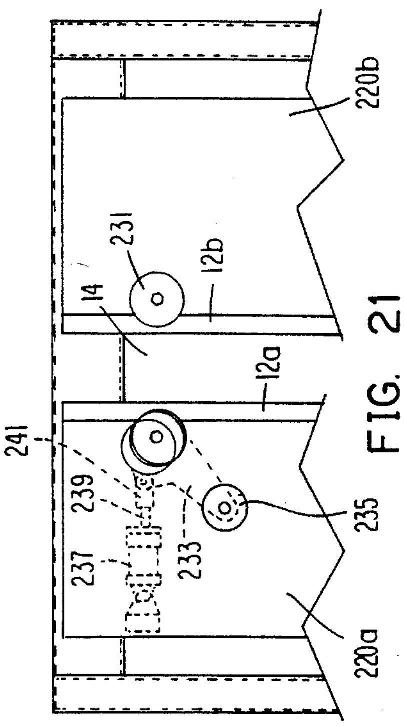
FIG. 21 is a top plan view of the matched outfeed drive roll assemblies of FIG. 20.
Figure 20:
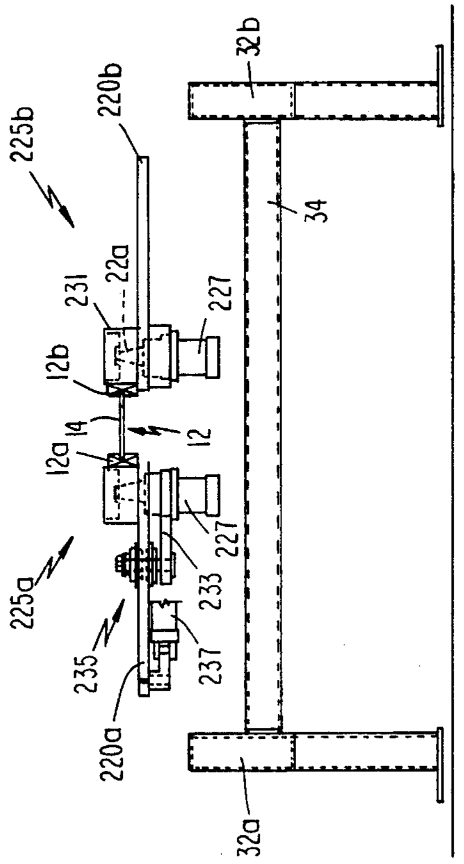
FIG. 20 is an end elevational view, partly in section, of a pair of flange outfeed vertical drive rolls in accordance with the invention.

As best depicted in FIGS. 20 and 21, each of the identical four right hand drive roll assemblies **225*b* is comprised of a hydraulic motor 227 (which may be identical to infeed motors 88) mounted to project downwardly from the right hand outfeed plate 220*b* and which is formed with a tapered drive shaft 229 having a vertical axis of rotation to which the outfeed roll 231 is mounted. Each left hand vertical drive roll assembly 225*a* preferably utilizes the same type of motor 227 and drive roll 231 as used in the right hand assemblies. However, as in the case of the swing arm operated, vertical infeed flange drive roll assemblies 40 described hereinabove, the motor unit 227 of each left hand assembly 225*a* is mounted to one end of a horizontally extending motor mount arm 233, the other end of which is pivotally secured to an upstream location of the left hand outfeed plate 220*a* with flange piloted bearings 235 as described hereinabove. A hydraulic cylinder 237 pivotally connected at one end to the bottom surface of the outfeed plate 220*a*** extends laterally inwardly so that its piston rod 239 may be pivotally connected with a clevis and pin arrangement 241 to the opposite end of the motor arm 233 proximate the motor unit 227. The drive roll 231 also mounted to the tapered shaft of the motor extends upwardly from the left hand outfeed plate 220*a* in coplanar alignment with the corresponding drive roll on the right hand plate 220*b* and is movable along a path of swinging movement defined by the motor mount arm 233 into and out of contact with the outer vertical face of the left hand flange 12*a*.

The feature of controlling each of the left and right hand vertical powered flange outfeed roll assemblies 225*a*,225*b* with separate motors, as will be discussed more fully below, advantageously allows each left and right hand side of the beam to be independently driven and controlled. This will enable the machine operator to prevent the beam from "creeping" which disadvantageously results in flange separation on one or both sides of the beam. Furthermore, the unique ability to swing the left hand powered rolls 225*a* into and out of contact with the left hand flanges 12*a* of the beam enables the machine operator to control the degree of pinching force being applied to the beam.

The hydraulic motor 88 used in each of the left and right hand flange speed-up drive roll assemblies is preferably of smaller displacement than the hydraulic motors 88 utilized in the left and right hand flange infeed drive roll assemblies to enable the speed-up rolls to rotate at a faster speed than the drive rolls. Likewise, the hydraulic motors 227 are of greater displacement than the hydraulic motors 88 used in the flange infeed drive roll assemblies so that the infeed drives normally operate faster than the outfeed drives to ensure positive flange-to-flange contact. The foregoing motor specifications are set forth in the hydraulic diagram of FIG. 28.

Likewise, the web speed-up hydraulic motors 166 and 198 are of smaller displacement than the web compression or traction drive hydraulic motors 166,198 to create an over-speed condition. The motor sizes are identified in the hydraulic diagram of FIG. 30.

Operating Logic and Methodology

The assembly machine 10 described in detail above may be operated through a series of manually or automatically adjustable settings, as will be known to one of ordinary skill in the art, to obtain proper flange speed-up and infeed and outfeed drive rates at appropriate pinching pressures, as well as the necessary web lug feed rates, and web speed-up and compression drive rates to obtain the necessary web speed and driving pressures as necessary to match the flange speeds.

The strength of the manufactured wooden I-beam product is dependent upon how well it is assembled and its certification ability is predicated on obtaining proper glue joints, web-to-flange and web-to-web compression, as well as proper control over the overall dimensional characteristics and adjustments for the flange and web members. To that end, and in accordance with a preferred feature of the invention, machine 10 is designed to provide a very controllable, smooth acceleration and deceleration of the process, based upon operator selectable and feedback types of control, to thereby control the amount of glue and the amount of pressure in all of the glue joints throughout the entire process so that a certifiable beam can be generated based upon specific operating parameters. As will be seen below, this can occur in accordance with the unique logic that may be incorporated into the machine 10 so as to create an ability to replicate and accurately and properly control the manufacturing process.

Machines presently used in the wooden I-beam manufacturing industry of which we are aware tend to require significant mechanical adjustment and open loop type of electrical controls with air operated pinches settable with air pressure gauges, resulting in an overall type of manual control which is not easily documentable as to the forces used to assemble the flanges 12*a*,12*b* and webs 14.

On the other hand, the basic premise of control, in accordance with a preferred operating format of the present invention, is that all drives are hydraulic, including the pinching forces that produce the traction as a result of the hydraulic cylinders 98,204,237, in order to obtain significant and settable pressures which will enable maximization of the driving forces attainable from the flange and web driving rolls and wheels. The logic of the system is premised on the objective of obtaining a beam outfeed which is running at a constant, programmable velocity. This constant throughput velocity is controlled by a fixed speed outfeed, wherein controllable forces can then be applied against the webs 14 and the flanges 12*a*,12*b* to ensure both adequate and adjustable glue bond forces and assembly forces as necessary to obtain a uniform, repeatable and adequate force.

To that end, hydraulically operated motor drives are utilized in this invention that have closed dual loop servo controls used to control both pressure and velocity.

Figure 22:
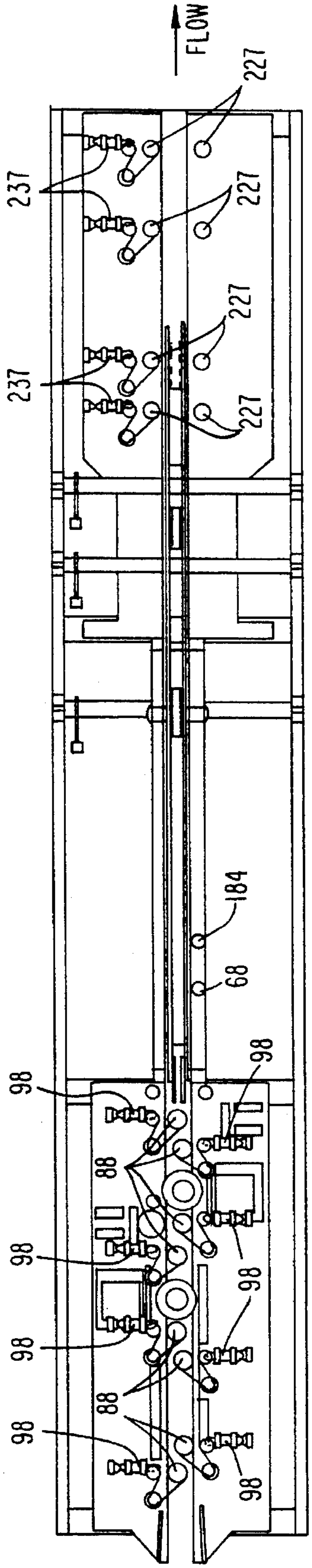
FIGS. 22 and 23 are top and side views, respectively corresponding to FIGS. 2B and 2A, depicting the various hydraulic drive motors and pinching cylinders used in the various drive assemblies of the present invention.
Figure 23:
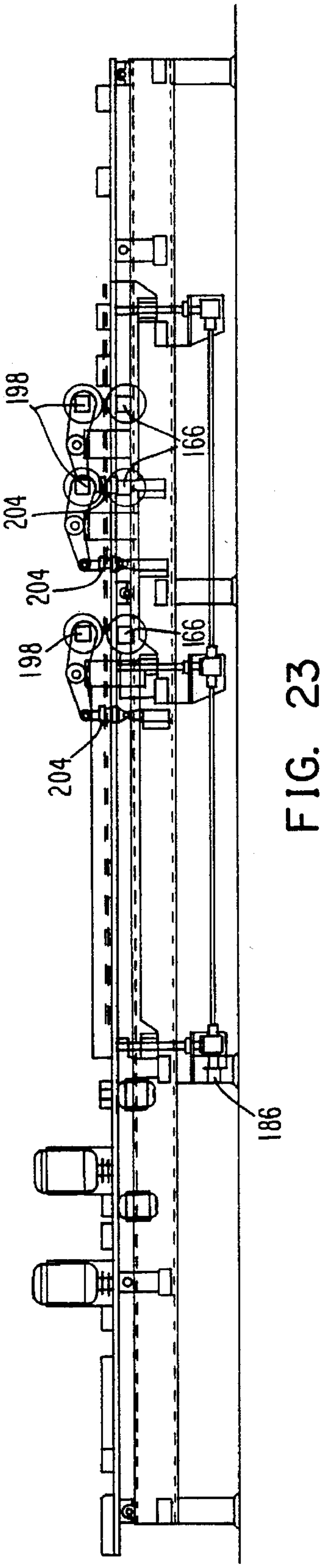

FIGS. 22 and 23 are schematic illustrations of all of the primary drives, described in detail above, which are used to assemble the webs and flanges together. Black dot circles are utilized to depict the locations of the hydraulic motors 88,227 used to directly and individually power each of the rolls in the flange speedup and infeed and outfeed drives, and in the web speed-up drive and web compression drive (motors 166,198), as well as in the web feed height adjustment drive (motor 186), machine width adjustment drive (motor 68), and web lugged feed drives (motor 184). Black rectangles depict the pinch cylinders.

Figure 24:
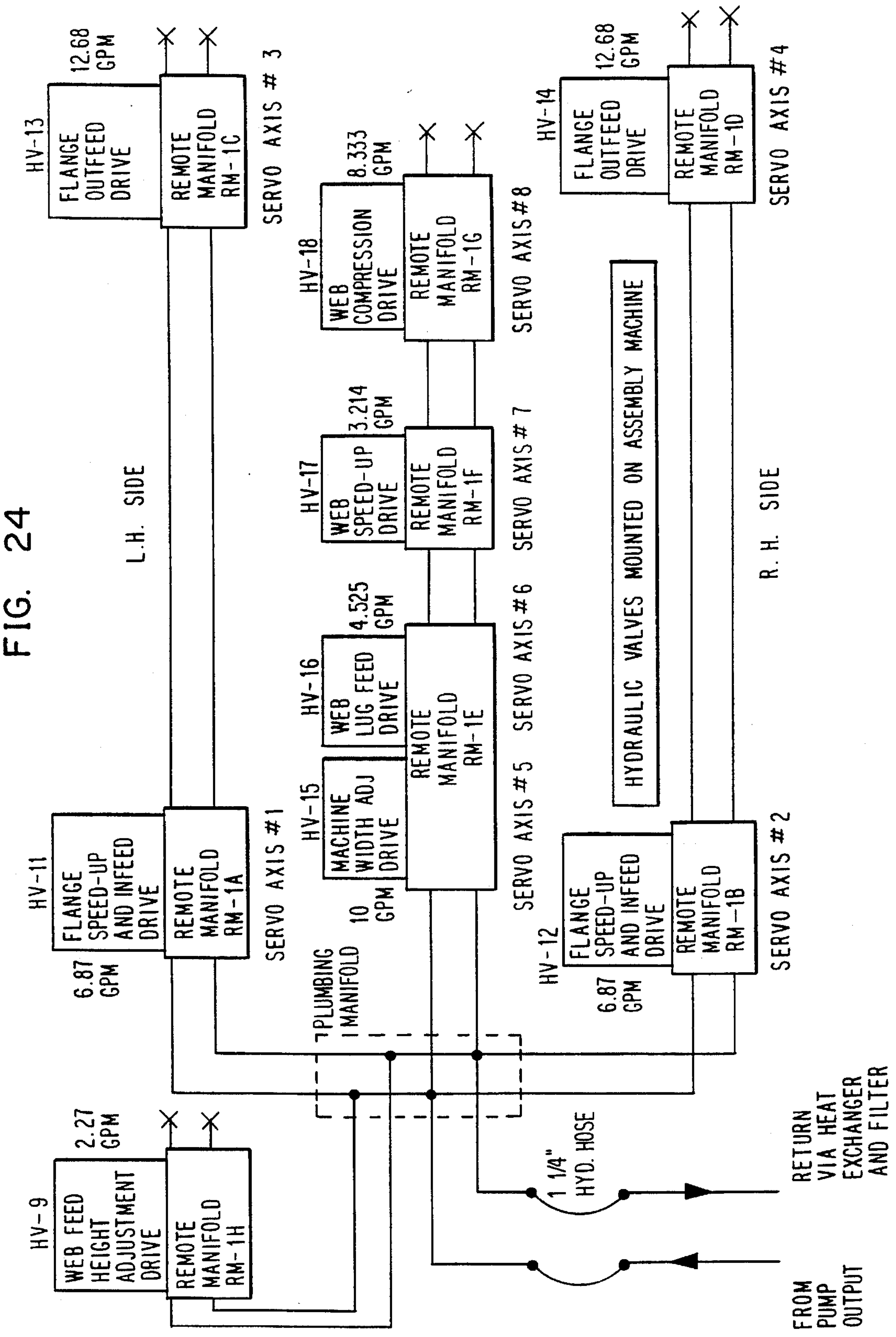
FIG. 24 is a hydraulic diagram depicting the eight microprocessor controlled axes in the present invention.

FIG. 24 is a schematic illustration of the hydraulic diagram depicting each of the eight closed loop servo axes. For example, servo axis number 1 controls the left hand flange infeed and speed-up vertical drive roll motors 88 while servo axis number 2 independently controls the identical drive roll motors 88 on the right hand side of the machine 10. Servo axes number 3 and 4 are respectively the left and right hand flange or beam outfeed drives (i.e., hydraulic motors 227) which are operated to run at a constant velocity and control the process throughout. Servo axis number 5 is used for machine width adjustment (i.e., controlled by rotation of the lead screw assemblies 28 through motor 68) and is generally a set-up drive having only an encoder on it for positioning. It is the only drive of the eight servo drives that does not have the dual capability of sensing pressure as well as position or velocity.

Servo axis number 6 is the web lugged feed drive which provides a stop and start conveyor control controlling movement of the opposing pusher lugs 190*a*,190*b* used to push the bottom web panel 14' out of the bottom of a stack. This web lug feed drive will have two modes of operation depending on the length of the webs in the hopper. In the event that eight foot long webs 14 are being used, the drive controls motor 184 to provide a continuous forward motion that may be intermittently interrupted between feeding of adjacent webs. If four foot webs are being used, then in order to lessen the web-to-web gap that would otherwise be produced, the lug 190*b* is operated in a reciprocating mode of operation wherein the lug is advanced forward for approximately two feet until the leading end of the web 14 engages the web run-up drive rolls 162,162*a*. Thereafter, the lug 190*b* is reciprocated back to the start position to feed the next-in-line web 14'.

Servo axis number 7 is the web speed-up (run-up) drive which is used to close up the gap that is inherently produced as a result of the discrete feeding of webs 14 out of the bottom feed stacker as discussed above. Once the gaps disappear, the web compression roll drives begin to apply pressure to the glued web-to-web joints. This drive is identified in FIG. 24 as servo axis number 8 and it is a four hydraulic motor, dual pinch drive which is the more powerful of the three drives which move the web and its primary purpose is to provide the full force required to compress the web-to-web joints as well as provide adequate force to assemble the webs into the grooves in the flange faces.

Figure 24A:
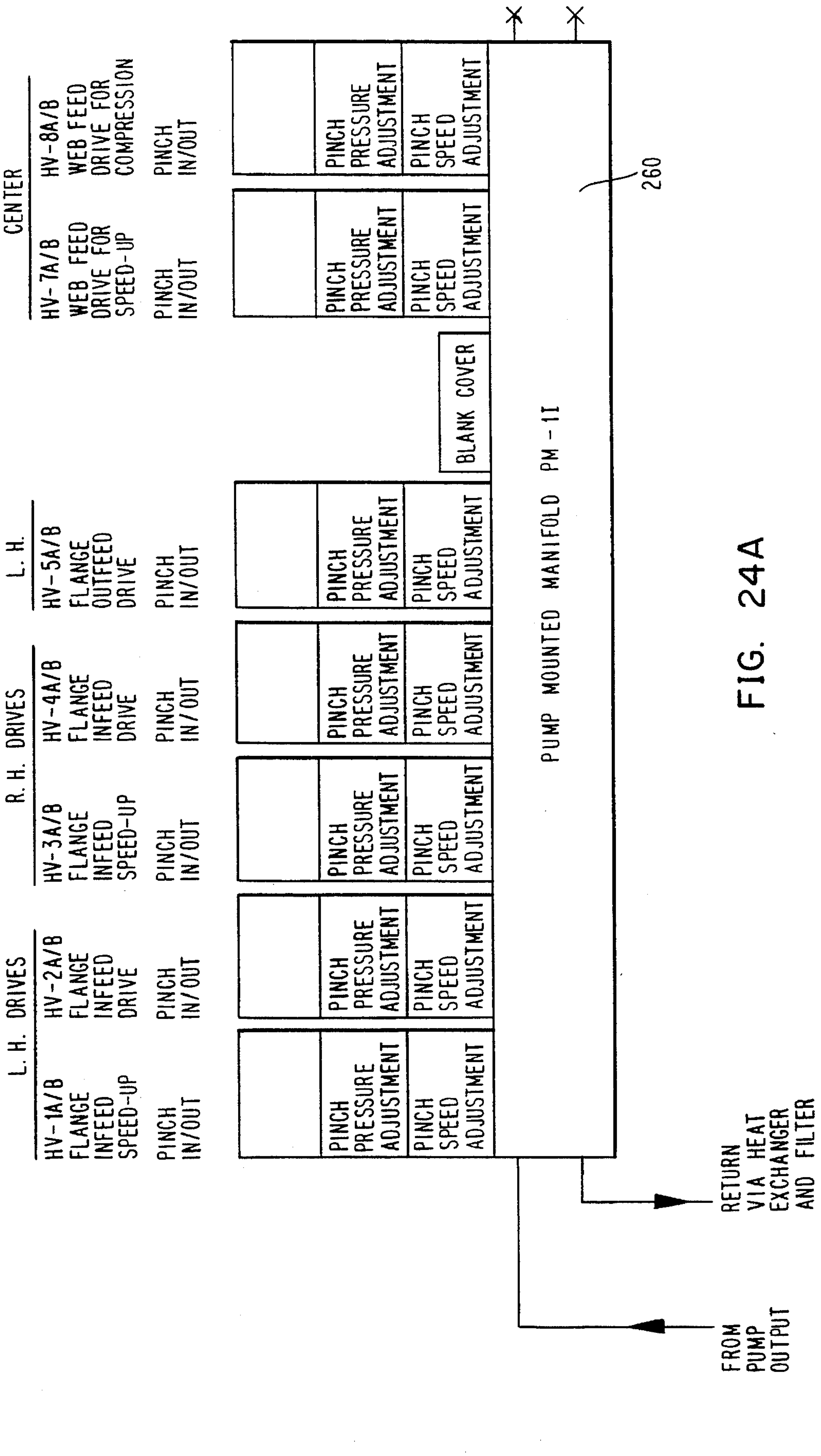
FIG. 24A is a hydraulic diagram of the pinching cylinders associated with the various drives.

FIG. 24A is a hydraulic diagram depicting a pump mounted manifold and the various flange and web pinches which are hydraulically operated pinches as discussed hereinabove. The pinch pressures, as explained more fully below, are essentially controlled by operating the various hydraulic cylinders used to control the flange infeed speed-up and drive vertical rolls, both left and right hand, as well as the flange outfeed drive (left hand), as well as the web feed drive or speed-up and the web feed drive for compression. These hydraulic circuits are characterized by a pressure reducing valve and a conventional directional control valve and flow control which allow for the setting of the pinch forces to ensure that an adequate force is provided to prevent slippage of the drive and without creating an excessive force which would tend to damage the beam. Each of the pinching forces is readable via a set of selectable pressure gauges. In the preferred embodiment, it is to be understood that the servo control axes 1–8 essentially are used to continuously monitor and adjust the various hydraulic motors associated with the different web and flange drive systems during the production run, whereas, in the preferred embodiment, it is presently a preferred practice to set the pinch forces to a maximum amount at the beginning of production without requiring a closed loop drive to adjust these pinches forces during the production run. It is to be understood, however, that other embodiments of this invention may utilize additional servo axes or closed loop controls which will enable constant monitoring and automatic adjustment of the pinching forces during the production run.

The hydraulic systems used to control pinch force and motor speed are preferably supplied with hydraulic fluid with a pressure compensated 60 horsepower 57 gallon per minute, 1,750 psi, hydraulic pump unit with oil cooler and return line filter, flooded suction and otherwise of conventional industrial quality and design. As used throughout the hydraulic diagrams herein, this pump unit is designated with the legend "PUMP OUTPUT" or "PRESSURE."

Figure 25:
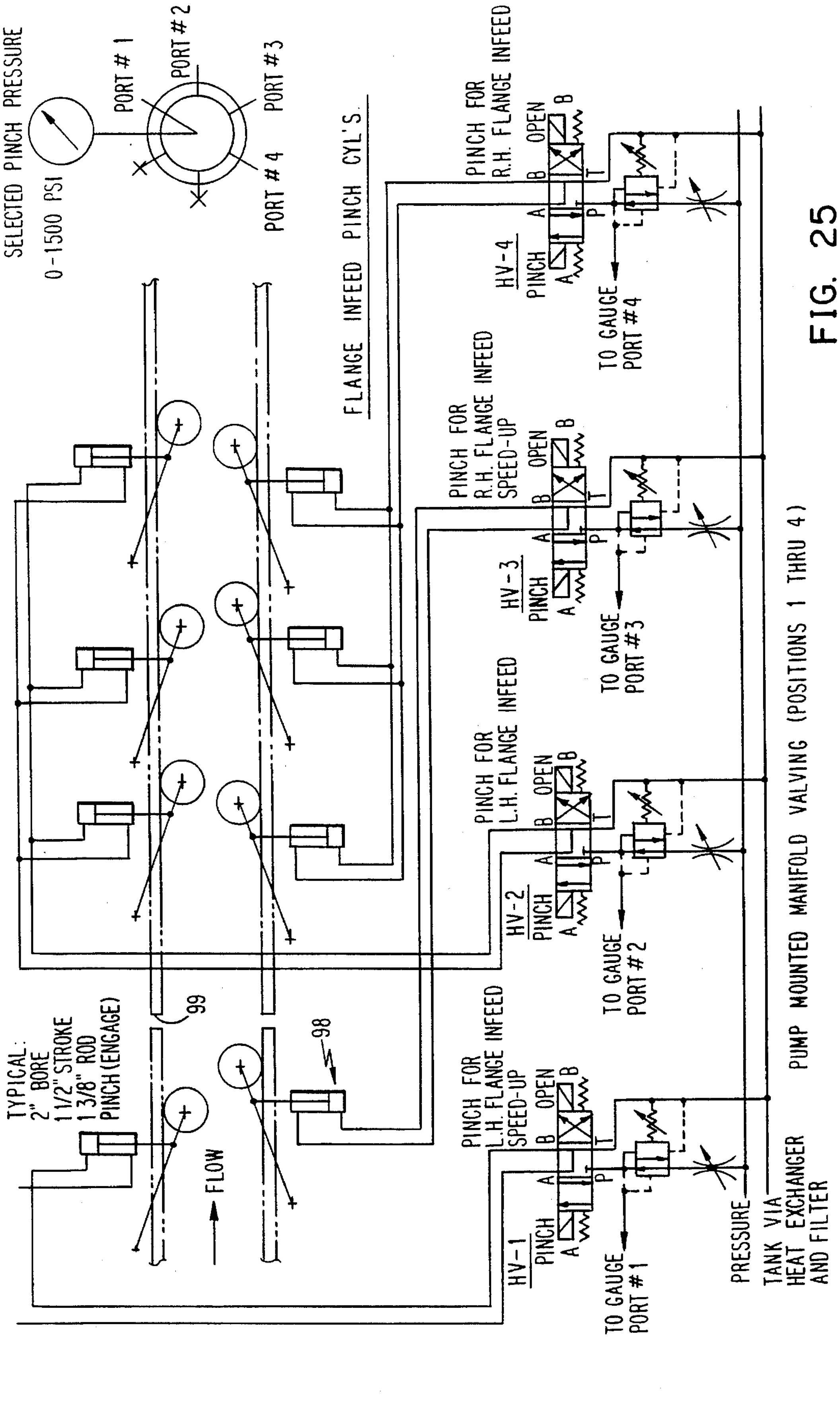
FIG. 25 is a hydraulic diagram depicting the manner in which the flange infeed pinch cylinders are interconnected.
Figure 26:
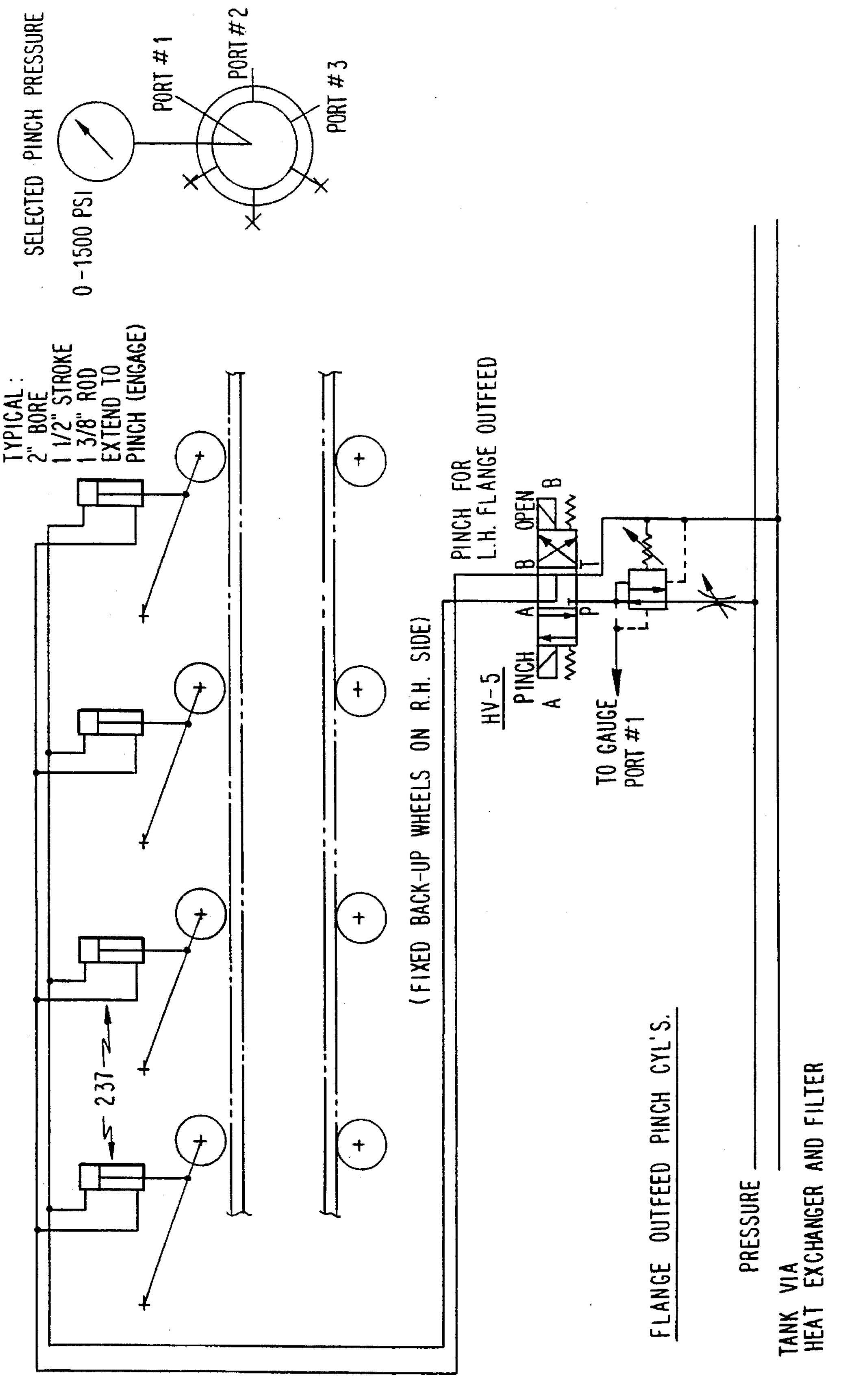
FIG. 26 is a hydraulic diagram depicting the hydraulic connection between the flange outfeed pinch cylinders.
Figure 27:
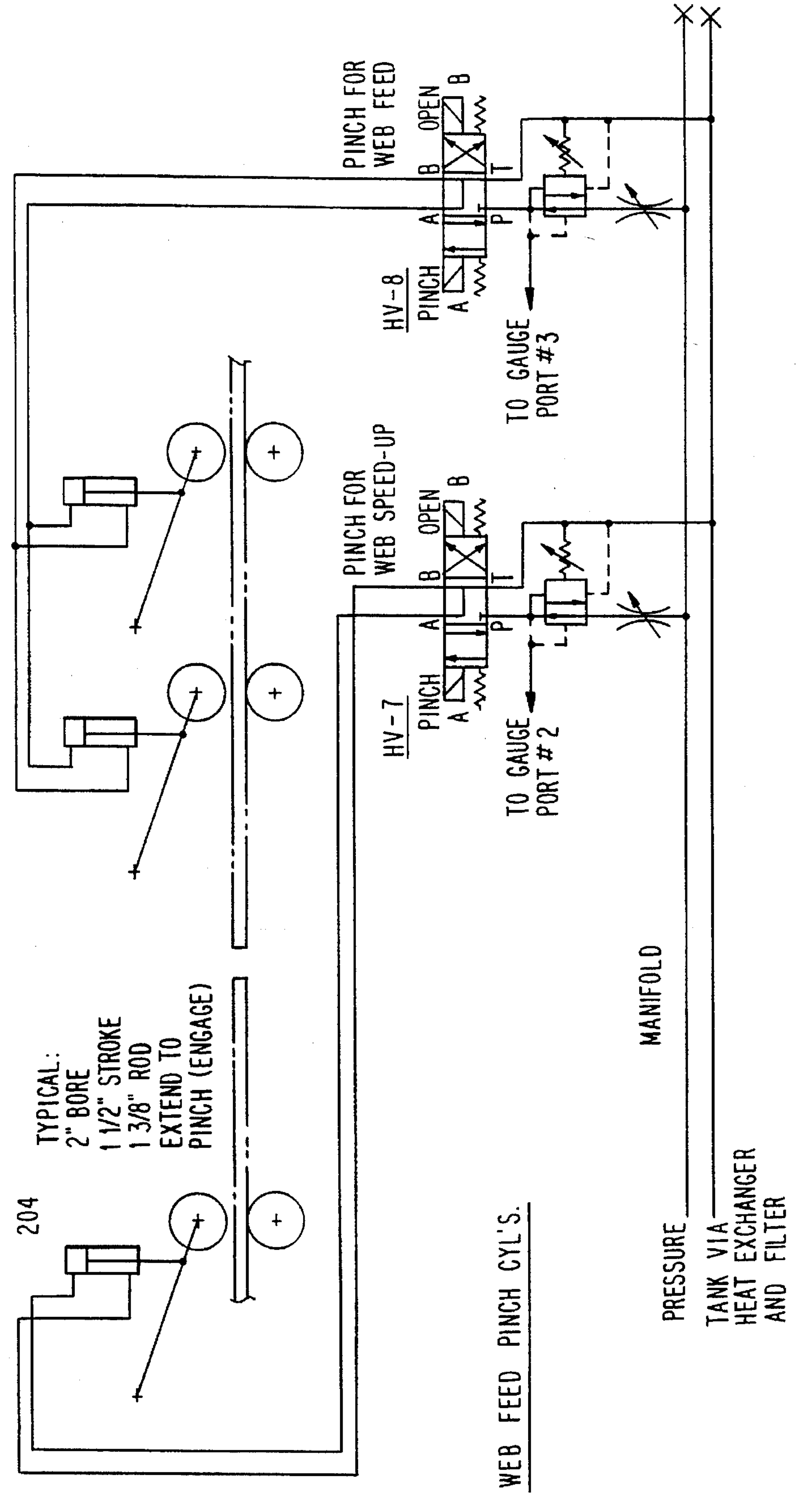
FIG. 27 is a hydraulic diagram depicting the manner of connection of the web feed pinch cylinders.

FIG. 25 is an illustration of the hydraulic diagram for the flange infeed pinch cylinders (each designated with reference numeral 98). FIG. 26 is a corresponding hydraulic diagram for controlling the flange outfeed pinch cylinders 237. FIG. 27 is a corresponding hydraulic diagram for controlling the web top feed pinch cylinders 204. In these systems, all of the hydraulic valves HV-1 through HV-8 are grouped on a single manifold 260 (FIG. 24A) which is readily available on the pump unit and there is provided a hydraulic pressure gauge and selector system enabling the operator to select the pressure of each of the these drives individually and set it for the pressure needed during any particular product run which then becomes a non-adjustable pressure during that run. The hydraulic valves HV-1 through HV-8 are preferably double solenoid directional control valves which are operated in series association with a mechanically adjusted relieving type of pressure reducing valve as depicted in these drawing figures.

Figure 28:
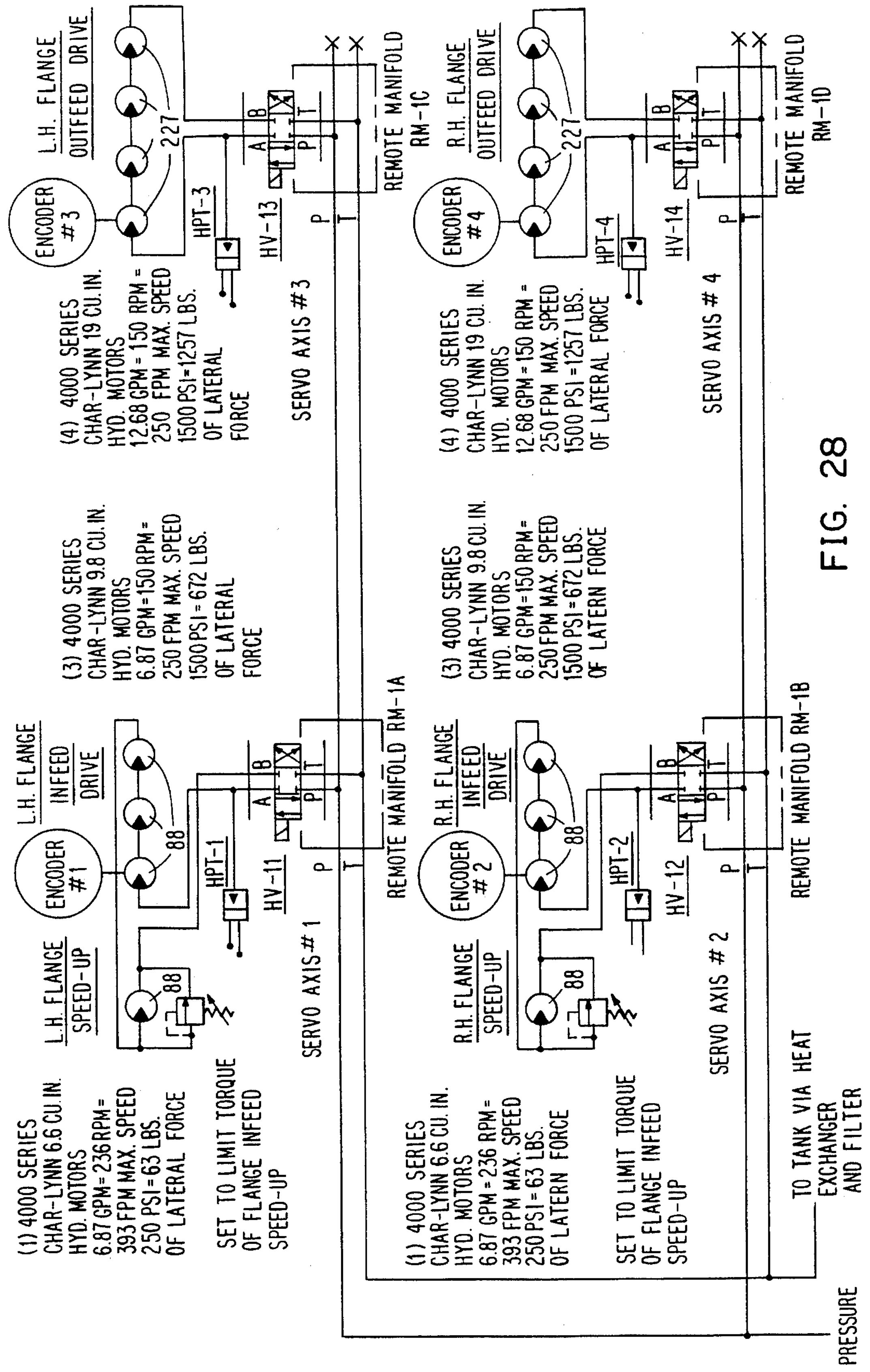
FIG. 28 is a hydraulic diagram of the manner of connection between the flange infeed and outfeed left and right hand drives.

FIG. 28 is a hydraulic diagram depicting flange servo drive axes #1 through number #4. Therein, the separate hydraulic motors 88 in the left and right hand flange speed-up drive systems (servo axes #1 and #2) are smaller displacement motors and therefore operated in an over-speed condition relative to the remaining three flange infeed drives in each left and right hand sides to close up the gap existing between the flanges 12*a*,12*b* before this gap reaches each of the three infeed drives. As mentioned above, servo axes #3 and #4 are the left and right hand flange or beam outfeed drives which are run at a constant velocity and are used to control the process throughput. The hydraulic motors associated with each of the speed-up, infeed and outfeed drives are respectively controlled with hydraulic valves HV-11 through HV-14.

Figure 29:
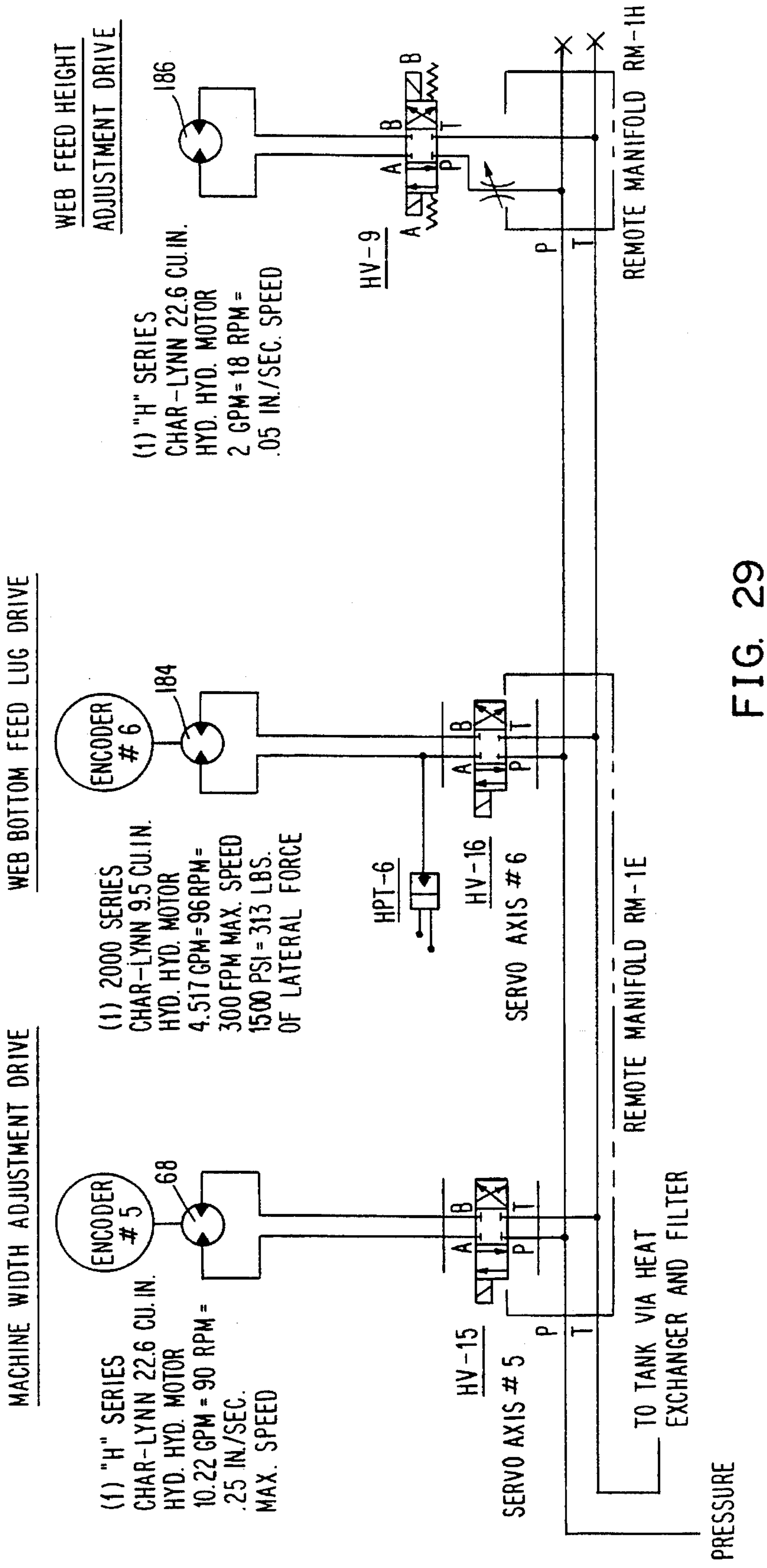
FIG. 29 is a hydraulic diagram depicting the manner of connection between the machine lateral adjustment drive, web bottom feed lug drive and web feed height adjustment drive axes.

FIG. 29 is a hydraulic diagram illustrating servo axis #5 which is used to control the lead screw assemblies 41 for adjusting the machine lateral width. It is merely a set-up drive and requires only an encoder for positioning detection and adjustment. It is the only drive of the servo drives that does not have the dual capability of sensing pressure as well as position or velocity and, therefore, it does not require a pressure transducer as is provided in each of the other servo axis controls.

Servo axis #6, also depicted in FIG. 29, utilizes hydraulic valve HV-16 to control the hydraulic motor 184 in the lugged web chain feed drive 150. As discussed above, this drive has two modes of operation depending upon whether four or eight foot long webs (or other nominal dimensions) are being used in the machine 10.

Figure 30:
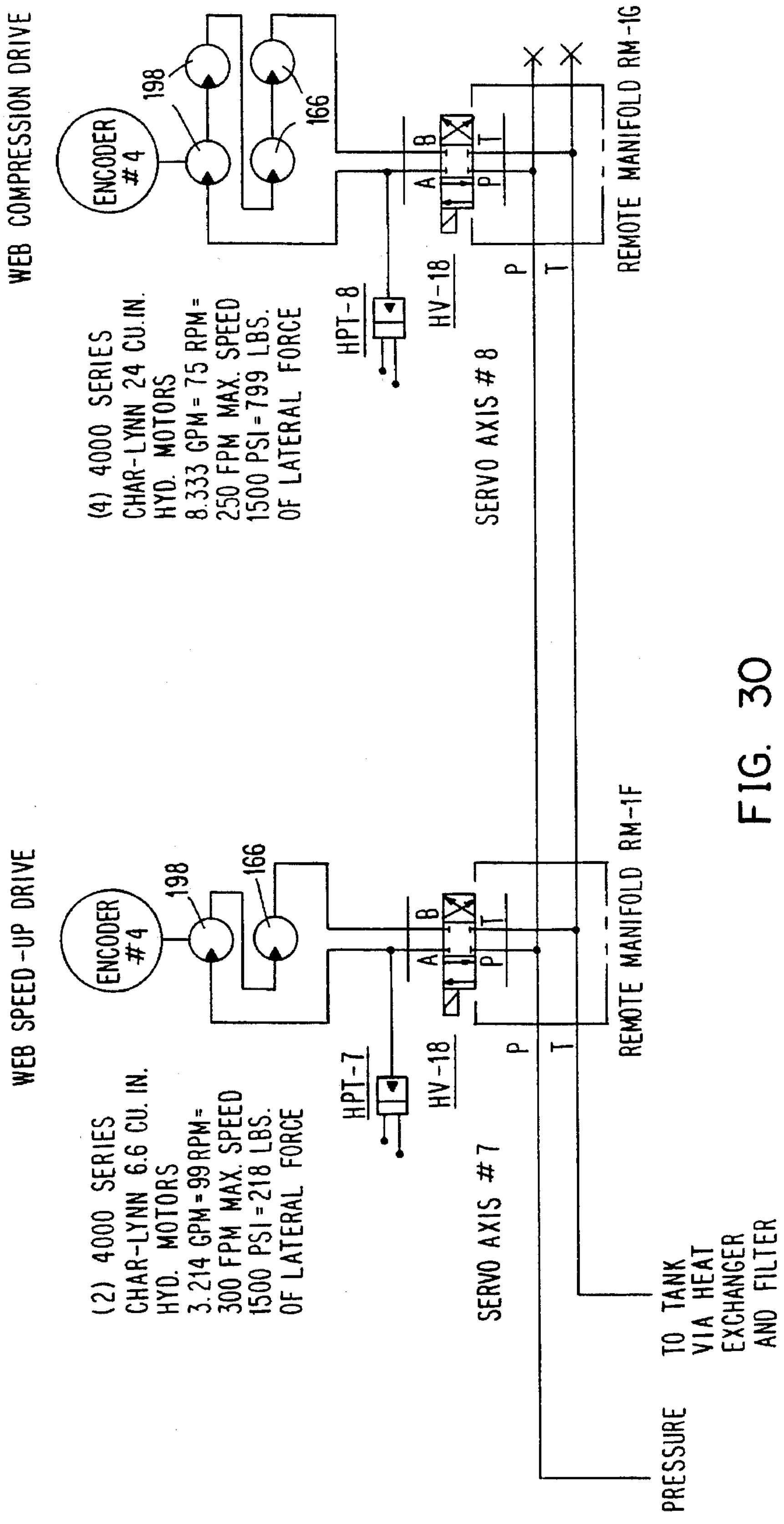
FIG. 30 is a hydraulic diagram depicting the manner of hydraulic connection between the web speed-up drive and the web compression drive.

FIG. 30 is a hydraulic diagram depicting web servo drive axes #7 and #8. Servo axis #7 controls the web speed-up drive the purpose of which is to close up the gap that it inherently produced as a result of discrete web feeding out of the bottom feed stacker.

Servo axis #8 is the web compression drive which is a four hydraulic motor, dual pinch drive controlled with hydraulic valve HV-18. It is the more powerful of the drives since its primary responsibility is to provide the full force required to compress the glued web-to-web joints together while providing adequate force to assemble the webs into the slots in the flange faces.

The I-beam assembly machine 10 of the preferred embodiment has a microprocessor based design with a data keyboard (not shown in detail) for entering various operating control parameters and a function control keyboard for controlling data entry and machine operations and a visual display. The data keyboard may be similar to a standard typewriter keyboard and enables the machine operator, through the Operator Interface Terminal, to interface with the programmable logic controller to provide the means of setting the required adjustments.

Figure 32:
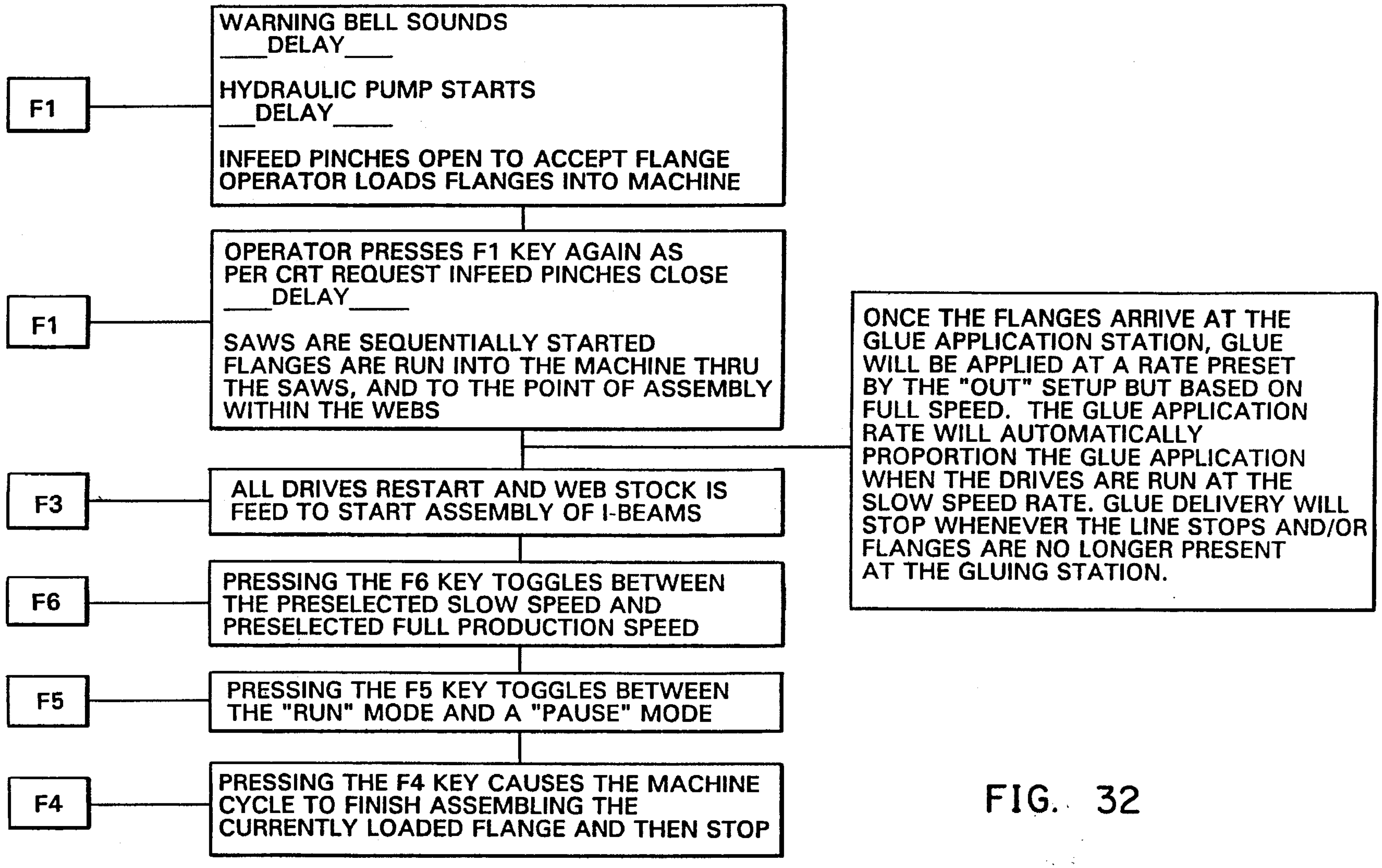
FIG. 32 is a block diagram depicting the basic operator sequence to load and run the I-beam assembly machine.

As mentioned above, I-beam assembly machine 10 may be controlled via Function Keys on the Operator Interface Terminal ("OIT"). FIG. 32 is a block diagram illustration of the basic operator sequence to load and run the machine 10. A more detailed overview of the available control may be as follows:

| Function Key | |
|---|---|
| F1 | Load an empty machine. |
| F2 | Reload flanges into a machine stopped with previous flanges still in machine. |
| F3 | Start process after machine has been pre-loaded via F1 or F2 function. |

-continued

| Function Key | |
|---|---|
| F4 | Assemble currently loaded flanges then STOP. |
| F5 | Toggle cycle ON/OFF (decelerate to a stop / accelerate back to full production). |
| F6 | Toggle between slow speed production and selected production speed. Special Note: System will start in slow speed when F3 is pressed. Press F6 when full production rate is desired. |
| F7 | Enter operating parameters for product to be made. |
| F8 | View current processes speeds and forces. |
| F9 | Change basic system tuning and interlocking. Special note: |
| F9 | is "Pass Word" protected to protect important settings. |
| F10 | Select drive to be jogged. |
| F11 | Jog drive selected with F10. |
| F12 | Cancel / Return to normal monitoring screens. |

Push buttons on the terminal may also be provided to jog the width adjustment drive Servo Axis #5. If the OIT screen indicates that processor power has been cycled off, the encoder position may not be correct. It will be necessary for the operator to jog the width adjustment to the "calibrate" dimension and then momentarily press the "CALIBRATE WITH ADJ" button. An OIT screen will ask for a confirmation and the width will be reset.

Push buttons may also be provided to jog the web bottom lug feed drive to a proper "home" position for the length of the web material being used. When the lug has been properly positioned, momentarily pressing the "LUG HOME" button will "zero" the encoder for Servo Axis #6. The lug will then cycle from this position during each web feed cycle.

The following sequence of events occur with respect to each function key:

SEQUENCE OF EVENTS FOR FUNCTION KEY "F1"

Preconditions:

Machine should be empty of flanges.. Operator responsibility.

Web stock can, but need not be, in machine at this time. Product parameters entered (F7) . . . Operator responsibility.

SEQUENCE:

Press "F1"

Any current operation is signaled to stop including saws. Pump starts.

2 Second delay while pump comes up to pressure.

IF POWER TO THE PROCESSOR HAD BEEN CYCLED OFF, the OIT will request a recalibration of the width adjustment.

Machine width and height adjustments move, if necessary, to positions entered via F7 set-up.

Width adjustment is Servo Axis #5.

Height adjustment is via an analog feed-back signal to the PLC and a COMPARE statement based logic.

All pinch wheel drives are disengaged.

Operator places flange stock in infeed pinch (just ahead of saws) and presses F1 again (as instructed by OIT screen).

Infeed pinches 98 engage.

After delay to engage pinches, saws are started.

Note: Saws are started in a sequence to reduce peak current.

After delay for saws to accelerate, infeed drives 88 accelerate to a slow speed and run flanges into and thru Saws .

Flanges stop when photo eyes (not shown in detail) see the leading edge of the flanges **12*a*, 12*b* arriving at the insertion point where the webs 14** are joined with the flanges.

The OIT will display a screen indicating that the flanges are properly positioned to start a new cycle.

Press the F3 key when ready to begin the production cycle.

Note:

The notch detector photo eyes keep the axis #3 and #4 at zero until the flanges start to be run into the outfeed pinches 237 via axis #3 and #4 when F3 is pressed.

SEQUENCE OF EVENTS FOR FUNCTION KEY "F2":

Preconditions:

Machine should have the trailing end of existing flanges somewhere between the infeed pinches and the farthest point where the web can be inserted into the notches in the flanges.

. . . Operator responsibility.

Web stock can, but need not be, in machine at this time.

Product parameters entered (F7) . . . Operator responsibility.

SEQUENCE:

Press "F2"

Any current operation is signaled to stop including saws. Pump starts.

2 Second delay while pump comes up to pressure.

IF POWER TO THE PROCESSOR HAD BEEN CYCLED OFF, the OIT will request a recalibration of the width adjustment. Machine width and height adjustments move, if necessary, to positions entered via F7 set-up.

Width adjustment is Servo Axis #5

Height adjustment is via an analog feed-back signal to the plc and a COMPARE statement based logic.

All pinch wheel drives are disengaged.

Operator places flange stock in infeed pinch (just ahead of saws) and presses F2 again (as instructed by OIT screen).

Infeed pinches engage.

After delay to engage pinches, saws are started.

Note: Saw are started in a sequence to reduce peak current.

After delay for saws to accelerate, infeed drives accelerate to a slow speed and run flanges into and thru SAWS.

Flanges stop when the pressure transducers on the infeed drives indicate that the drives have "stalled" when the leading edge of the new flanges hit the trailing edges of the previously loaded flanges.

The OIT will display a screen indicating that the flanges are properly positioned to start a new cycle. Press the F3 key when ready to begin the production cycle.

SEQUENCE OF EVENTS FOR FUNCTION KEY "F3":

Preconditions:

The machine must be pre-loaded per F1 or F2 function key cycles. . . Operator responsibility.

The Flying saw 16 must be signaling that it is ready for operation.

SEQUENCE:

Press "F3"

The pump motor will start (if not already running). The infeed pinches will be engaged.

After a delay to engage the flange pinches, the saw motors are sequentially started (unless already running). The web feed will be run at a slow speed until a web is present at the insertion point where a photoelectric eye actuates.

The flange and web drives will then accelerate to a special slow speed rate and the assembly process will begin.

The outfeed flange drive pinches are signalled to close. The speed will remain at this special slow speed until the flanges actuate a photo eye at the far outfeed end of the machine. (This special slow speed is intended to allow time for the flange pinches to open when the flange end arrives at each wheel and pushes it open slightly.) The speed will increase to the selected production rate when the operator presses the F6 key.

SEQUENCE OF EVENTS FOR FUNCTION KEY "F4":

This key will decelerate the production speed to the slow-speed rate. When the flange detector signals that the trailing edge of the flanges 12*a*, 12*b* is near the front edge of the webs 14, the lug feeder is signaled to stop any new feed cycles. The webs currently in transit to be assembled will continue. The web speed-up and compression drive feed wheel pinches open as the web passes under the drives.

The outfeed flange drives 225*a*, 225*b* continue until the trailing edge of the beam is seen by a sensor passing the final outfeed drive.

If no production is restarted within a specified period of time the saws and then the pump are de-energized.

SEQUENCE OF EVENTS FOR FUNCTION KEY "F5":

This key simply sets the production speed to zero. All sequences remain active during deceleration and while at "zero" speed (pause production).

Pressing F5 again will re-accelerate production.

SEQUENCE OF EVENTS FOR FUNCTION KEY "F6":

This key simply toggles the production speed between a slow speed rate and the selected full speed production rate. Speed changes are ramped.

FUNCTION KEY "F7":

This key begins a series of screens requesting operating parameters for the specific product to be made. Dimensions, feed rates, and assembly forces are entered. The intention is that each new size of product will need some test runs to determine the optimum setting for feed rate, assembly forces, and set-up dimensions. These settings then are recorded, on product set-up forms, so that they can be easily and accurately repeated on any future production runs.

FUNCTION KEY "F8":

This key allows access to a series of monitoring screens that show speeds, forces, and discrete input and output information useful production monitoring and troubleshooting.

FUNCTION KEY "F9":

This key begins a series of set-up screens requesting operating parameters not normally adjusted with changes in product runs. These parameters interlock and tune basic machine operation. To prevent unauthorized modifications, access to these parameters is protected by a password number.

FUNCTION KEYS "F10 and F11":

F10 displays a series of options to jog one or more of the servo drives. Enter the "code" number for the drive(s) to be jogged then use F11 to jog the drives.

FUNCTION KEY "F12":

This key is used to cancel any currently displayed OIT screen and return to the standard status monitoring mode.

WEB FEEDING OPERATION:

As previously stated, jog controls are provided for positioning the feed lug 190*a* or 190*b* in the proper place for the bottom feeding of the webs 14 from the stack. The lug is jogged into position and the encoder for that axis (Axis #6) is zero'd with a pushbutton command. The lug (or the "opposite" lug) will automatically return to this position at the end of each feed cycle.

There are two selectable modes of operation for the lug feed. They are as follows:

OPTION #1 . . . Forward feed

This option allows forward feeding of the lug only. The lug pushes the bottom web forward into the speed-up pinch wheels. The speed-up pulls the web away from the lug and the lug continues forward until the opposite lug is at the starting position. The drive stops and waits for the trailing edge o#the web to clear the web stack (i.e., generate a gap). The feed cycle repeats. Option #1 is intended for full length (8 ft.) webs. OPTION #2 . . . Forward feed / Reverse to Start This option allows forward feeding of the lug a specified distance and then return to the start position. The lug is positioned (and the axis "zero'd") directly behind the trailing edge of the webs. The lug only pushes forward enough to feed the bottom web into the speed-up pinch. The return speed is a fixed high speed, allowing the lug to be fully returned before the trailing edge of the web clears the bottom of the stack and the feed cycle is repeated.

The forward speed of the lug drive is set as a percentage of the actual speed of the flange outfeed drive. This keeps the amount of gap between webs, and the point at which the speed-up drive can close the gap, a constant relationship at any selected line speed or accel./decel. rate.

There is a sensor located just at the forward edge of the web stack. It senses the moment that the previous web has been feed clear of the stack so that the next feed cycle can begin.

A sensor signals the system to ramp down to slow speed if the stack of webs is getting low. If more webs can not be loaded in time, the operator must press the F5 key to stop the process until the web feeder can be reloaded. New lug feed cycles stop when a sensor sees a trailing edge of the flange pass a point basically even with the forward edge of the webs (minus the web to web gap prior to the web speed-up).

Figure 31A:
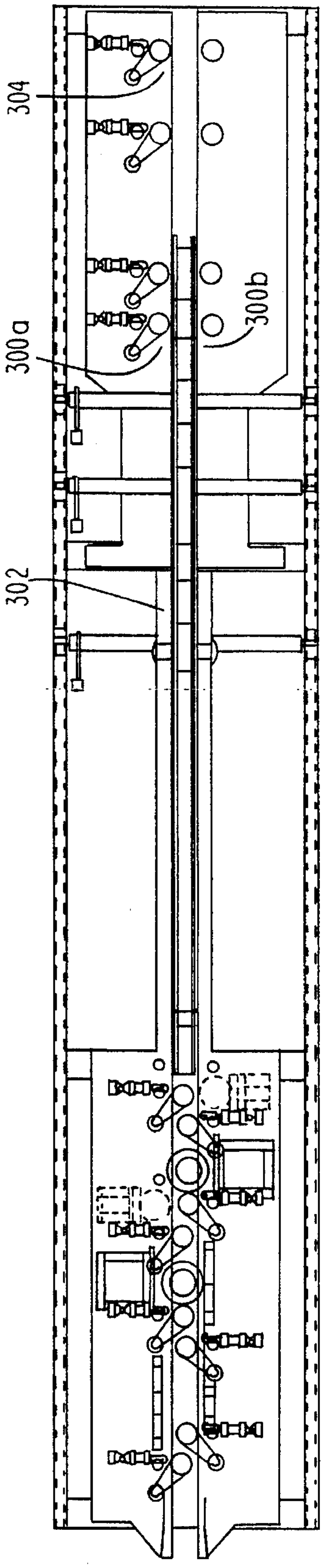
FIGS. 31A and 31B are top and elevational sectional views corresponding to FIGS. 2B and 2A to depict the location of various photo-detectors used to provide input signals into the microprocessor based control system.

A pair of photo eye detectors are located, in line with each other, at a point upstream from the outfeed pinch rolls equal to less than the minimum flange width. The photo eyes will detect a notch formed on the end of the flange. The photo eyes are of a thru-beam type. These photo eyes may be connected to high-speed inputs on the outfeed motion control Servo Axis #3 and #4. These photo eyes keep the notches (butt-joints) of the flanges 12A, 12B even by applying small corrections to the feed rate of Servo Axis #3. These detectors are identified in FIG. 31A with reference numerals 300A and 300B.

Proximity type photo eye 302 detects the end of flange position at the point where the web feeder should stop feeding more webs. This logic is used to prevent the webs from being fed after the last set of flanges has been loaded.

Proximity type photo eyes are positioned proximate notch detectors 300A, 300B to detect the arrival of the leading edge of the flanges 12A, 12B at the point where the webs 14 begin to be inserted into the grooves in the flanges. These photo eyes stop the flanges at the end of a "F1" key loading cycle.

A proximity type photo eye 304 detects whether a flange has arrived at the end of assembly machine 10 (i.e., just before the last flange outfeed wheel). This photo eye 304 switches the machine 10 from the special slow speed rate to load and form the beginning of the I-beam to the standard slow speed setting. It is also used to signal the completion of the last I-beam as it is about to exit the machine 10. This signals all pinches to open and all drives to decelerate to a stop.

Figure 31B:
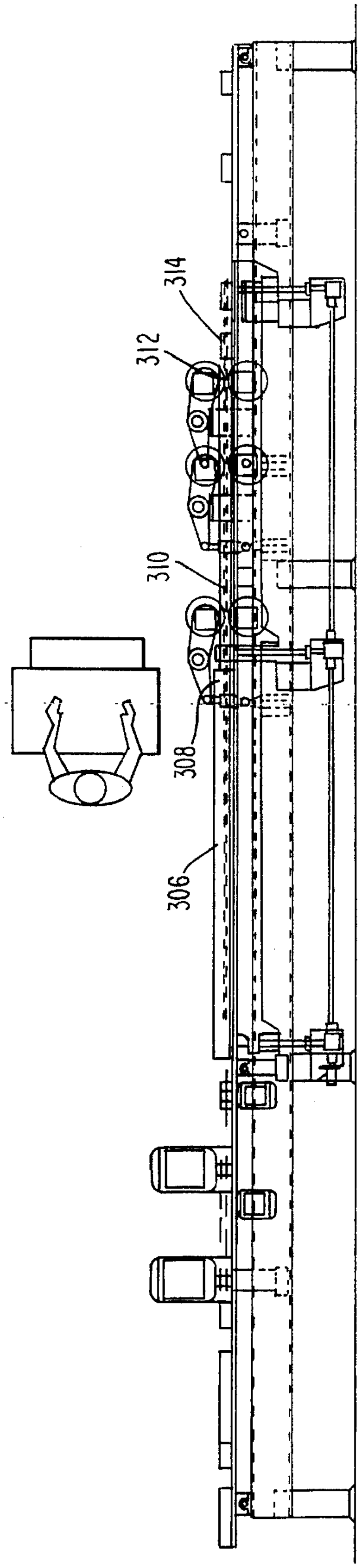

A photo eye sensor 306 (FIG. 31B) detects when the stack of webs 14 is getting low. This signals assembly machine 10 to slow until the stack is refilled.

A proximity type photo eye 308 (also FIG. 31B) detects the trailing edge of a web 14 exiting from under the stack. This photo eye 308 triggers the lug feed drive 150 to feed the next web 14'.

A proximity type photo eye 310 detects webs slightly past the web speed up pinch wheels. This photo eye depressurizes the pinch for the web speed up drive when no web is present. This prevents the pinch from lowering between the gaps and breaking the leading edge of the next web.

A proximity type photo eye 312 detects the web under the second set of web compression drive pinch wheels. This photo eye 312 pressurizes the compression drive pinch wheels to drive when the first web has been feed under the drive wheels. The speed up drive keeps the gaps closed between the webs before entering the compression drives. This means that the compression drive pinch will remain pressurized until the last web exits the pinches.

A proximity type photo eye 314 detects the leading edge of the web arriving at the point where the web and flange begin to be joined. This photo eye 314 stops the web here to pre-stage the web in preparation for start of matched speed assembly of webs to flanges.

As previously mentioned, the Operator Interface Terminal provides the main means of operator control. The function keys are assigned specific tasks as previously described.

Suitable microprocessor based control, capable of being prepared by one of ordinary skill in the art as a result of reviewing this specification, is provided to implement the control methodology discussed in detail above. To summarize, the control methodology used to operate machine 10 is based upon maintaining the flange outfeed drives at a preselected, constant speed inputted by the operator through the OIT, with the remaining infeed drives and web drive being programmed to operate at a operator selected percentage of the speed selected for outfeed flange servo axes #3 and #4. The output speed and speed percentages controlling the other drives are operator inputted through a series of set-up screens available through the OIT. When the machine has been properly "tuned," the operating parameters for closing up all of the flange and web gaps and the amount of forces that are required to obtain glue bonds may be set, monitored and logged to enable any particular process to be replicated during future production runs.

During the actual beam forming process, i.e., when the machine is running at a certain preselected continuous speed, the microprocessor based controller controls the flange infeed and web drives to maintain the desired output speed and pressure. Once the system is operating at a preselected, full speed, the microprocessor control allows the drives to, for instance, speed-up to a selected percentage speed or over-speed so that the flange and web gaps are appropriately closed. At all other times when the gaps are closed up to compress the glue joints together, the microprocessor control perceives that the gaps have been closed up through the use of the photo-eye detector arrangement, for example. This information is fed into the microprocessor in real time via hydraulic pressure transducers as well which are present on all the servo axes (with the exception of servo axes #5). Primarily by microprocessor monitorization of the hydraulic pressure in any particular drive, the microprocessor control can determine whether or not the product is being moved with a gap between it and the next discrete product or webs. When the flanges abut one another, for example, and the flange run-up drive attempts to overdrive, this will generate a pressure increase which is sensed by the appropriate hydraulic pressure transducer. Therefore, once a settable threshold pressure has been attained for each drive, the microprocessor control operates to switch from a speed based control which is used for closing a gap, to a forced based control speed for maintaining a desired level of force.

Figure 33:
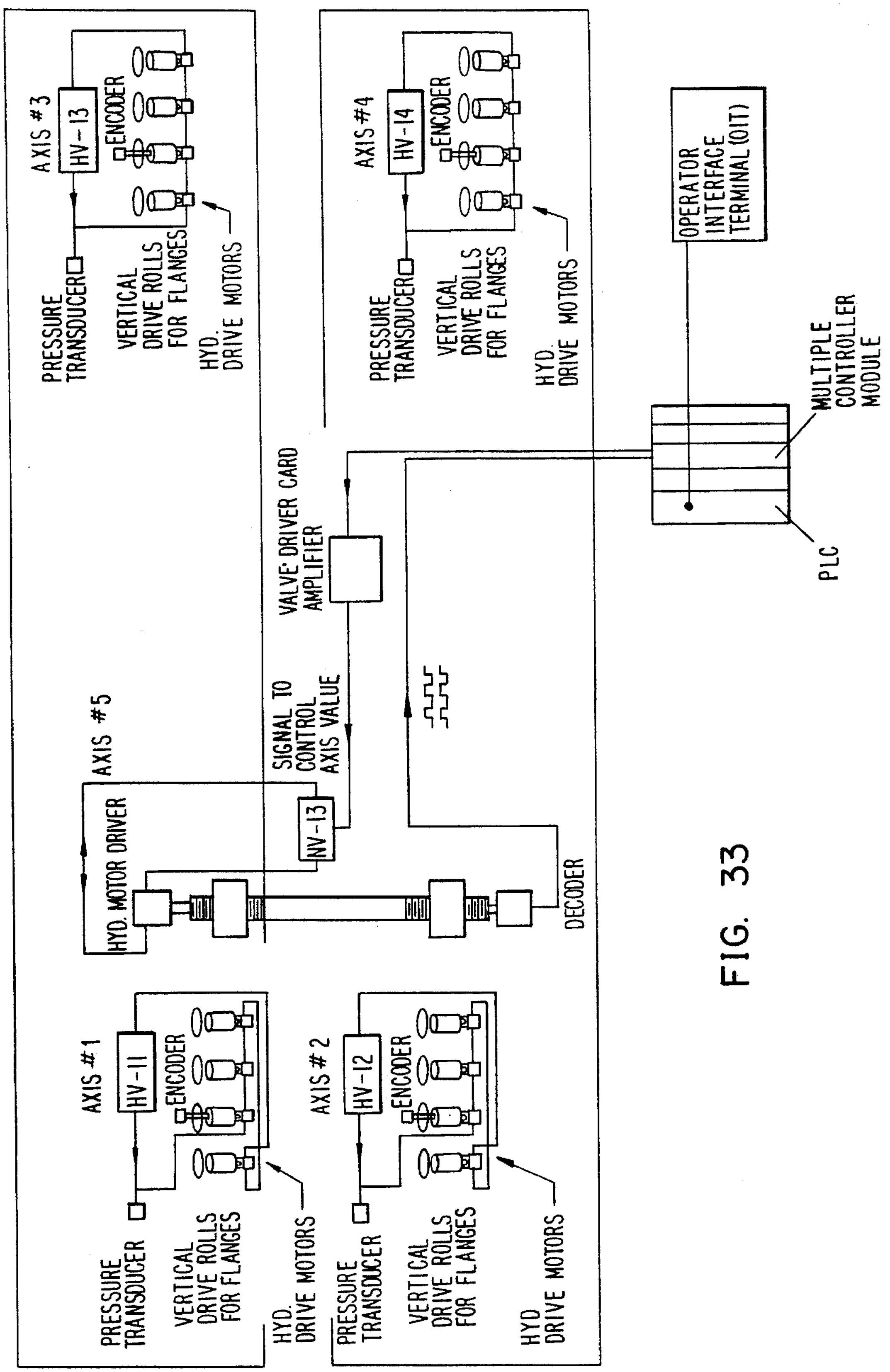
FIG. 33 is a hydraulic diagram which better depicts the interface between the multiple axis controller modules with the lead screw assemblies for adjusting machine width.

FIG. 33 is a hydraulic diagram which better depicts the interface between the multiple axis controller modules with the lead screw assemblies for adjusting machine width. Therein, it can be seen that the Operator Interface Terminal provides the means of entering the required width adjustment between the flange drive rolls. It also provides the means of setting the proper vertical height for the web feed. The width adjustment is set via axis #5 which is a closed loop control utilizing an encoder for positional feedback. The controller provides a signal which must be amplified before use to control the axis valve. A valve driver card is used as the amplifier. The encoder returns a quaderature pulse stream indicating drive movement and direction. The controller then calculates velocity based on pulses received per time interval.

Figure 34:
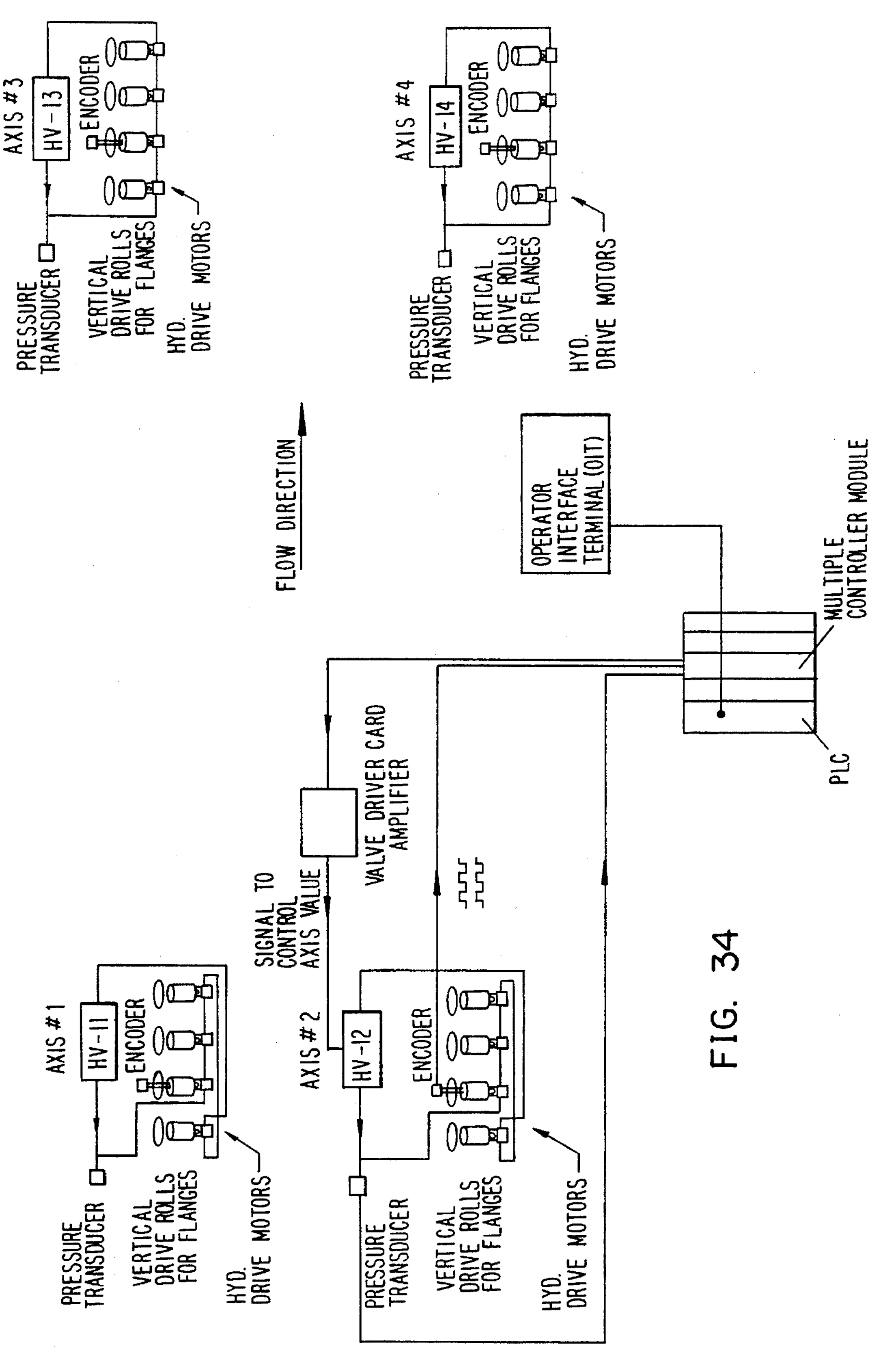
FIG. 34 is a block diagram depicting the typical closed loop servo control used for controlling infeed and outfeed flange drive axes #1–4.

FIG. 34 is a block diagram depicting the typical closed loop servo control used for controlling infeed and outfeed flange drive axes #1–4. As mentioned above, the Operator Interface Terminal provides the means of entering required speeds, ratios of speeds between various drive elements discussed above, and drive forces. The terminal also provides a means of monitoring system operations including current sequence, velocities, positions, forces, I/O bit status, and electric motor current draw. Error messages are displayed when the system is requested to operate outside of its design limits or interlocking settings.

In accordance with the basic operation of the system, axes #1 and 2 are counter-rotating closed loop servo controlled hydraulic powered drives which run at a slightly higher speed than the outfeed drive axes #3 and 4 with speed regulation provided via the encoder feedback to the controller. This "over-speed" condition is used to close any gaps between flanges. When the flanges are butted together, the over-speed drive command causes the pressure to abruptly rise at the pressure transducer. The pressure transducer signals this condition to the controller. The controller is programmed to then reduce the speed command and internally switches its-control mode from speed control to force limiting control in a manner which will now occur to one of ordinary skill. The controller will now provide a signal to the infeed which will provide the force required for proper assembly of the I-beam. If a gap should occur between flanges, the pressure falls off as the drives "free wheel" and the drive re-selects the encoder based speed regulation until the gap is again closed between the flanges.

With reference to FIG. 34, the controller provides a signal which must be amplified with the valve driver card before used to control the hydraulic valve axis. Each encoder returns a quaderature pulse stream indicating drive movement and direction. The controller also calculates velocity based on pulses received per time interval. Each pressure transducer returns a signal equal to the hydraulic pressure demand on the axis drive. The pressure signal is used to regulate the torque of the axis to provide a constant and controlled lateral force for assembly of the I-beam glue joints.

The outfeed drive (axis #3 and 4) run at a common and constant velocity, as discussed above. These two drives sense the torque requirement at the outfeed rolls via the pressure transducers but do not shift to a torque limiting (pressure regulating) mode. The pressure transducers for the outfeeds are used only to signal assembly forces being applied.

Figure 35:
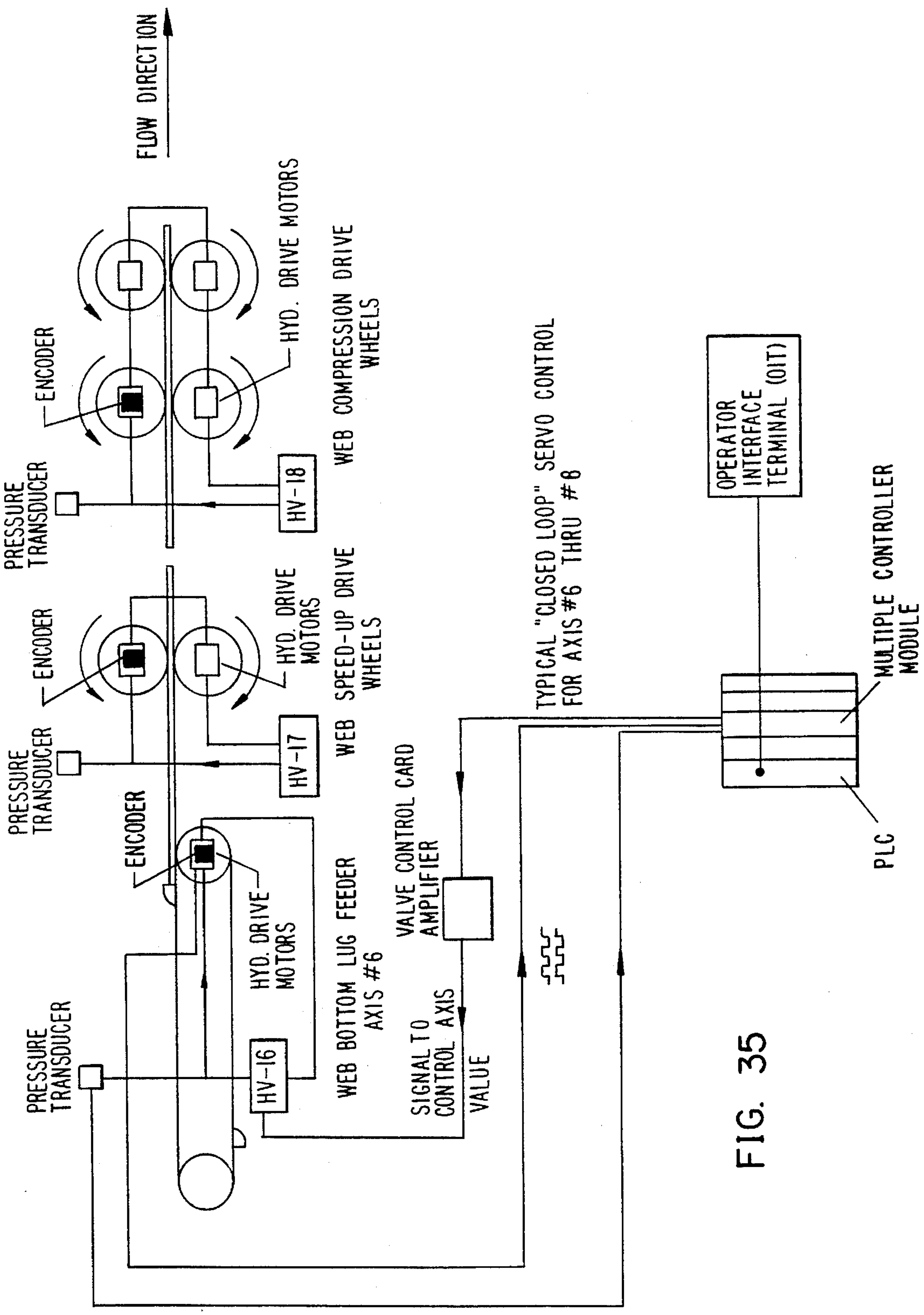
FIG. 35 is a block diagram illustration depicting the controller interface with the web lug feeder, and web speed-up and compression drive rolls.

FIG. 35 is a block diagram illustration depicting the controller interface with the web lug feeder, and web speed-up and compression drive rolls. The method of operation is discussed above. However, it is to be noted that the web compression drive provides the primary force for the assembly of the glued joints (web-to-web and web-to-flange) and that all three drives will run at a percentage speed-up to the commanded line speed as set by the outfeed drives when there are gaps between the webs. This speed is controlled via the encoder feedback closed loop. When the web being driven is run into the previously fed web (and/or into the flange glue joints), the pressure transducer abruptly switches the control to a pressure (a lateral force) mode to provide the glue and assembly forces requested via the Operator Interface Terminal. The drive will return to the higher encoder controlled speed whenever gaps between the webs occur.

The drives throughout the system are therefore involved in maintaining a selected torque or force necessary for a particular glue type, flange width, flange length, etc., in order to maintain the proper degree of compression necessary in the glue joints to properly assemble and set the glue. When the hydraulic pressure transducer which is an electrical device (or an analog electrical sensor) puts out a varying voltage depending on the hydraulic pressure which is in a direct relationship to the force with which the relevant ones of the hydraulic motors are pushing on the product. If the signal voltage from the pressure transducer indicates that insufficient pushing force is being provided by any particular drive, that drive through the microprocessor is commanded to increase its speed or attempt to increase its speed, which will increase the compression forces. If the compression forces exceed the desired range or value, this will be detected by the controller through the input provided by the hydraulic pressure transducer. The electronic controller will then decrease the signal voltage to the appropriate hydraulic valve. Pressure control is achieved through this type of loop controller as opposed to a velocity control.

Therefore, the control system of this invention provides settable and readable forces as well as velocity and does not rely on mechanical slippage of pitch rolls in order to limit torque. The controller of the invention controls with great precision the position at which the product gaps are closed up, and how hard the glue joints are pushed together. The microprocessor controls the drives in a proportional manner, as mentioned above, so that the forces and the relationships of the components of the product within the assembly process are identical as the machine is smoothly accelerated to operating speed and decelerated at the end of the process. In this manner, the machine produces first and last beams which are of the same quality as beams produced during the intermediate portions of the process.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A production line assembly machine for manufacturing a wooden I-beam from a pair of elongated wooden flange members each having a longitudinal groove formed in one of the faces of the flange, and planar wooden web members having opposite longitudinal edges, comprising:

(a) a pair of flange chutes mounted to a machine base for conveying an opposing pair of flanges along left and right hand sides of the machine, respectively;

(b) a flange infeed drive assembly for driving said pair of flanges along said flange chutes;

(c) a web conveyor area between the flange chutes for conveying said web members between said left and right hand flanges;

(d) a web drive system for driving said webs in end-to-end relationship between said flange chutes, said flange chutes converging towards a machine center line axis to enable the web edges to be respectively inserted into the converging flange grooves in joined relationship to form the beam;

(e) a flange outfeed drive assembly engaging the flanges of the joined beam to convey same towards the discharge end of the machine; and (f) a lateral adjustment mechanism connected between the flange chutes and machine base for simultaneously moving the chutes either in inward or outward center justified relation to the machine center line axis to thereby vary the spacing between the flange chutes and allow for use of webs of different width.

2. The machine of claim 1, wherein said lateral adjustment mechanism includes a plurality of laterally extending lead screw assemblies mounted to the machine base at longitudinally spaced intervals, each lead screw assembly including:

(i) a lead screw having an unthreaded central portion and opposite end portions which are left and right handed threaded portions, respectively;

(ii) bearing members attached to the machine base for rotatably supporting said unthreaded central portion;

(iii) a pair of lateral movement transmitting mechanisms, each including at least one slide block and nut arrangement both connected with a respective one flange chute and in respective sliding engagement with the central portion and an associated one of said threaded portions, whereby rotation of the lead screw causes said chutes to jointly move laterally inward or outward through the action of the left and right handed screw portions.

3. The machine of claim 2, whereby each flange chute has a bottom formed with a generally flat surface extending the length of the machine to support the flanges in smooth sliding engagement.

4. The machine of claim 3, wherein said chute bottom extends continuously the length of the machine without bottom rolls providing rolling contact with the flange bottoms.

5. The machine of claim 1, whereby each flange chute has a bottom formed with a generally flat surface extending the length of the machine to support the flanges in smooth sliding engagement.

6. The machine of claim 2, further including a lateral adjustment mechanism drive having a motor and connecting drive shafts for synchronous rotation of each said lead screw.

7. The machine of claim 1, wherein said flange infeed drive assembly includes a plurality of drive rolls respectively having vertical rotational axes and located adjacent each chute to engage the wide faces of said left and right flanges.

8. The machine of claim 7, further including plural idler rolls respectively associated with each drive roll and positioned on an opposite side of the associated chute to contact an opposing wide face of the flange being conveyed along said chute.

9. The machine of claim 8, wherein each idler roll has an axis of rotation canted towards the chute by a predetermined angle from the vertical.

10. The machine of claim 9, wherein said predetermined angle is approximately one-half to one degree.

11. The machine of claim 10, wherein said canted idler roll eliminates plural hold-down rolls in each chute engaging an upward exposed narrow face of the flange.

12. The machine of claim 7, wherein said drive roll is swingably mounted to an associated one of said chutes on a swing arm pivotally connected to the chute, and further including a cylinder connected between the chute and the drive roll for moving said drive roll between a flange engaging position and a disengaging position.

13. The machine of claim 12, further comprising plural motors respectively attached to the swing arms to rotate each said associated drive roll it is dedicated to.

14. The machine of claim 1, wherein said web conveyor area includes a pair of web bottom support rails located between said chutes, and further including a plurality of vertical column screws connecting said rails to said machine base, whereby rotation of said column screws results in vertical height adjusting movement of said rails relative to, and inbetween, said chutes.

15. The machine of claim 14, further including a plurality of nut portions extending between said rails, said column screws being respectively threadedly received in said nut portions.

16. The machine of claim 15, further including a first upper bearing between said rails for rotatably connecting an upper portion of the screw to the machine base, and a second lower bearing for rotatably connecting a lower portion of said screw to said base.

17. The machine of claim 16, further comprising a column screw adjustment motor connected with drive shafts to synchronously rotate each column screw.

18. The machine of claim 17, wherein said support rails are non-adjustable in the lateral direction and said chutes are non-adjustable in the vertical direction.

19. The machine of claim 18, wherein said support rails are respectively formed with at least one pair of vertically elongate aligned slots through which passes at least a part of said lateral adjustment mechanism, said slots permitting vertical movement of said support rails without affecting the vertically immovable lateral adjustment mechanism extending through said slots.

20. The machine of claim 1, wherein said flange infeed drive assembly includes a plurality of infeed drive rolls each driven by a dedicated hydraulic motor mounted thereto.

21. The machine of claim 20, wherein said web drive system includes a plurality of web drive rolls each driven by a dedicated hydraulic motor mounted thereto.

22. The machine of claim 21, wherein said web drive rolls include top web drive rolls and bottom web drive rolls.

23. The machine of claim 22, wherein said flange outfeed drive assembly includes a plurality of outfeed drive rolls respectively engaging each of the left and right flanges of the formed beam, each outfeed drive roll being driven with a dedicated hydraulic motor mounted thereto.

24. The machine of claim 22, further comprising control means for driving said outfeed drive rolls at a preselected, substantially constant speed, said control means being operable to control each said infeed flange drive roll and said web drive rolls to ensure that said outfeed drive rolls are maintained at said constant speed.

25. The machine of claim 24, wherein said control means includes closed loop feedback controllers for adjusting said web and said infeed drive rolls.

26. The machine of claim 24, wherein said control means adjusts the left and right outfeed drive rolls based upon means for sensing an identifier in each said left and right flange to ensure matched drive speeds.

27. A production line assembly machine for manufacturing a wooden I-beam from a pair of elongated wooden flange members each having a longitudinal groove formed in one of the faces of the flange, and planar wooden web members having opposite longitudinal edges, comprising:

(a) a pair of flange chutes mounted to a machine base for conveying an opposing pair of flanges along left and right hand sides of the machine, respectively;

(b) a flange infeed drive assembly for driving said pair of flanges along said flange chutes;

(c) a web conveyor area between the flange chutes for conveying said web members between said left and right hand flanges;

(d) a web drive system for driving said webs in end-to-end relationship between said flange chutes, said flange chutes converging towards a machine center line axis to enable the web edges to be respectively inserted into the converging flange grooves in joined relationship to form the beam;

(e) a flange outfeed drive assembly engaging the flanges of the joined beam to convey same towards the discharge end of the machine;

(f) whereby each flange chute has a bottom formed with a generally flat surface extending the length of the machine to support the flanges in smooth sliding engagement, and (g) wherein said chute bottom extends continuously the length of the machine without bottom rolls providing rolling contact with the flange bottoms.

28. A production line assembly machine for manufacturing a wooden I-beam from a pair of elongated wooden flange members each having a longitudinal groove formed in one of the faces of the flange, and planar wooden web members having opposite longitudinal edges, comprising:

(a) a pair of flange chutes mounted to a machine base for conveying an opposing pair of flanges along left and right hand sides of the machine, respectively;

(b) a flange infeed drive assembly for driving said pair of flanges along said flange chutes, wherein said flange infeed drive assembly includes a plurality of drive rolls respectively having vertical rotational axes and located adjacent each chute to engage the wide faces of said left and right flanges;

(c) a web conveyor area between the flange chutes for conveying said web members between said left and right hand flanges;

(d) a web drive system for driving said webs in end-to-end relationship between said flange chutes, said flange chutes converging towards the machine center line axis to enable the web edges to be respectively inserted into the converging flange grooves in joined relationship to form the beam;

(e) a flange outfeed drive assembly engaging the flanges of the joined beam to convey same towards the discharge end of the machine.

29. A production line assembly machine for manufacturing a wooden I-beam from a pair of elongated wooden flange members each having a longitudinal groove formed in one of the faces of the flange, and planar wooden web members having opposite longitudinal edges, comprising:

(a) a pair of flange chutes mounted to a machine base for conveying an opposing pair of flanges along left and right hand sides of the machine, respectively;

(b) a flange infeed drive assembly for driving said pair of flanges along said flange chutes;

(c) a web conveyor area between the flange chutes for conveying said web members between said left and right hand flanges, wherein said web conveyor area includes a pair of web bottom support rails located between said chutes, and further including a plurality of vertical column screws connecting said rails to said machine base, whereby rotation of said column screws results in vertical height adjusting movement of said rails relative to, and inbetween, said chutes;

(d) a web drive system for driving said webs in end-to-end relationship between said flange chutes, said flange chutes converging towards the machine center line axis to enable the web edges to be respectively inserted into the converging flange grooves in joined relationship to form the beam;

(e) a flange outfeed drive assembly engaging the flanges of the joined beam to convey same towards the discharge end of the machine.

30. A production line assembly machine for manufacturing a wooden I-beam from a pair of elongated wooden flange members each having a longitudinal groove formed in one of the faces of the flange, and planar wooden web members having opposite longitudinal edges, comprising:

(a) a pair of flange chutes mounted to a machine base for conveying an opposing pair of flanges along left and right hand sides of the machine, respectively;

(b) a flange infeed drive assembly for driving said pair of flanges along said flange chutes;

(c) a web conveyor area between the flange chutes for conveying said web members between said left and right hand flanges;

(d) a web drive system for driving said webs in end-to-end relationship between said flange chutes, said flange chutes converging towards the machine center line axis to enable the web edges to be respectively inserted into the converging flange grooves in joined relationship to form the beam;

(e) a flange outfeed drive assembly engaging the flanges of the joined beam to convey same towards the discharge end of the machine;

wherein said flange infeed drive assembly includes a plurality of infeed drive rolls each driven by a dedicated hydraulic motor mounted thereto, wherein said web drive system includes a plurality of web drive rolls each driven by a dedicated hydraulic motor mounted thereto, wherein said web drive rolls include top web drive rolls and bottom web drive rolls, wherein said flange outfeed drive assembly includes a plurality of outfeed drive rolls respectively engaging each of the left and right flanges of the formed beam, each outfeed drive roll being driven with a dedicated hydraulic motor mounted thereto, further comprising control means for driving said outfeed drive rolls at a preselected, substantially constant speed, said control means being operable to control each said infeed flange drive roll and said web drive rolls to ensure that said outfeed drive rolls are maintained at said constant speed.

31. A method of manufacturing a wooden I-beam from a pair of elongated wooden flange members each having a longitudinal groove formed in one of the faces of the flange, and planar wooden web members having opposite longitudinal edges, comprising the steps of conveying an opposing pair of said flanges along left and right hand flange chutes within the machine utilizing a plurality of infeed flange drive rolls; conveying a plurality of web members between said flange chutes in end-to-end relationship with a plurality of top and bottom web drive rolls; said left and right hand flanges being gradually converged to enable the web edges to be respectively inserted into the flange grooves in joined relationship to form the beam; conveying the joined beam towards a discharge end of said machine with a plurality of flange outfeed drive rolls, and controlling the speed of operation of said flange infeed drive rolls and said web drive rolls so that a substantially constant output speed is achieved with said flange outfeed drive rolls.

* * * * *